(12) United States Patent
Iwahori et al.

(10) Patent No.: US 12,474,717 B2
(45) Date of Patent: Nov. 18, 2025

(54) SYSTEM, MOVING OBJECT, METHOD OF MANUFACTURING MOVING OBJECT, AND SERVER

(71) Applicant: TOYOTA JIDOSHA KABUSHIKI KAISHA, Toyota (JP)

(72) Inventors: Kento Iwahori, Nagoya (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 89 days.

(21) Appl. No.: 18/425,083

(22) Filed: Jan. 29, 2024

(65) Prior Publication Data

US 2024/0280998 A1 Aug. 22, 2024

(30) Foreign Application Priority Data

Feb. 17, 2023 (JP) .................................. 2023-023301
Oct. 2, 2023 (JP) .................................. 2023-171101

(51) Int. Cl.
| | |
|---|---|
| *G05D 1/22* | (2024.01) |
| *G05D 1/225* | (2024.01) |
| *G05D 1/65* | (2024.01) |
| G05D 105/45 | (2024.01) |
| G05D 107/70 | (2024.01) |

(52) U.S. Cl.
CPC .............. *G05D 1/225* (2024.01); *G05D 1/65* (2024.01); G05D 2105/45 (2024.01); G05D 2107/70 (2024.01)

(58) Field of Classification Search
CPC ...... G05D 1/225; G05D 1/65; G05D 2105/45; G05D 2107/70

USPC .............................................. 701/2
See application file for complete search history.

(56) References Cited

U.S. PATENT DOCUMENTS

| | | | |
|---|---|---|---|
| 2017/0320529 A1 | 11/2017 | Nordbruch | |
| 2020/0140028 A1* | 5/2020 | Wells | ................... G05D 1/0225 |
| 2020/0159249 A1* | 5/2020 | Mithal | ................... B65G 43/10 |
| 2024/0160226 A1* | 5/2024 | Bell | ....................... G05D 1/644 |

FOREIGN PATENT DOCUMENTS

| | | |
|---|---|---|
| DE | 10 2019 114 796 A1 | 5/2020 |
| DE | 10 2021 202 323 A1 | 9/2022 |
| JP | 2017-538619 A | 12/2017 |

* cited by examiner

*Primary Examiner* — Mahmoud S Ismail
(74) *Attorney, Agent, or Firm* — Oblon, McClelland, Maier & Neustadt, L.L.P.

(57) ABSTRACT

A system used in a factory for manufacture of a moving object comprises: a remote controller that moves the moving object by remote control, the moving object being movable in the factory during a course of manufacture in the factory, the moving object including a communication device having a communication function for the remote control and a driving controller that implements driving control over the moving object; a manufacturing status acquisition unit that acquires information about a manufacturing status in the factory including delay in a step; and a speed setting unit that sets a moving speed of the moving object using the acquired manufacturing status. The remote controller moves the moving object in a transport zone between steps at the set moving speed of the moving object by the remote control.

8 Claims, 11 Drawing Sheets

Fig.2A
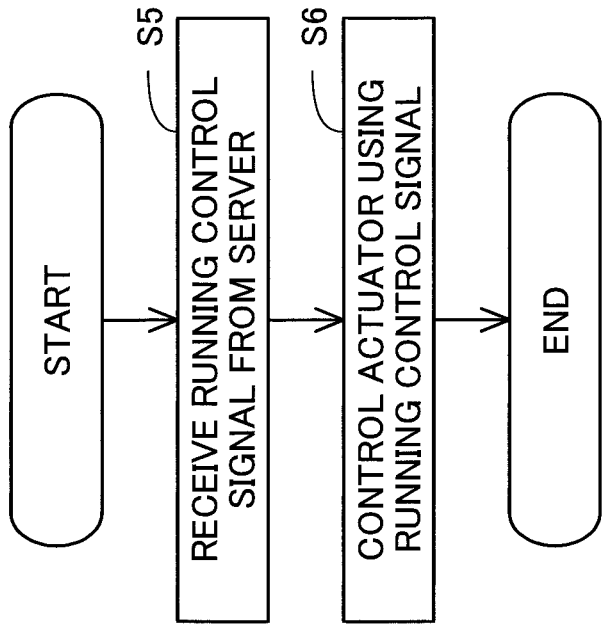
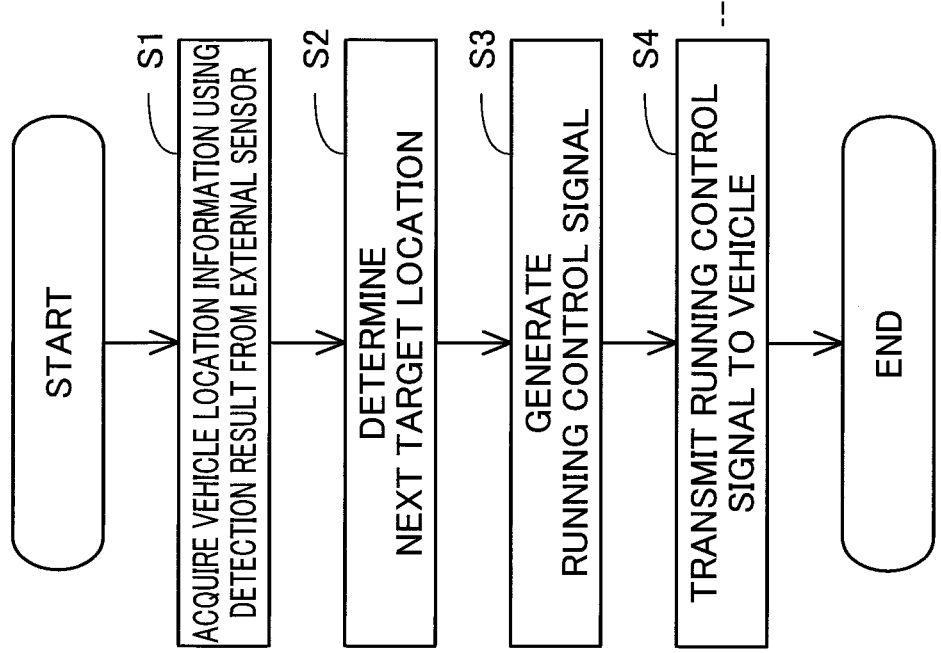

SYSTEM, MOVING OBJECT, METHOD OF MANUFACTURING MOVING OBJECT, AND SERVER

CROSS-REFERENCE TO RELATED APPLICATIONS

The present application claims priority from Japanese patent application P2023-023301 filed on Feb. 17, 2023 and Japanese patent application P2023-171101 filed on Oct. 2, 2023, the disclosures of which are hereby incorporated in their entirety by reference into the present application.

BACKGROUND

Field

The present disclosure relates to a system, a moving object, a method of manufacturing a moving object, and a server.

Related Art

For example, Japanese Patent Application Publication (Translation of PCT Application) No. 2017-538619 discloses a vehicle running method of causing a vehicle to run from an end of an assembly line of a manufacturing system to a parking area of the manufacturing system by remote control.

To manufacture a product efficiently, it is preferable that the product be manufactured according to a proper target time in each step. During a course of manufacturing a moving object while moving the moving object by unmanned operation, it is desired that a moving speed of the moving object between steps be adjusted to a moving speed appropriate for a manufacturing status in each step.

SUMMARY

The present disclosure is feasible in the following aspects.

According to one aspect of the present disclosure, a system that is used in a factory for manufacture of a moving object is provided. The system comprises: a remote controller that moves the moving object by remote control, the moving object being movable in the factory during a course of manufacture in the factory, the moving object including a communication device having a communication function for the remote control and a driving controller that implements driving control over the moving object; a manufacturing status acquisition unit that acquires information about a manufacturing status in the factory, the manufacturing status including delay in a step; and a speed setting unit that sets a moving speed of the moving object using the acquired manufacturing status. The remote controller moves the moving object in a transport zone between steps at the set moving speed of the moving object by the remote control.

BRIEF DESCRIPTION OF THE DRAWINGS

FIG. 2A is a flowchart showing a running method of causing a vehicle to run realized by a server;

DETAILED DESCRIPTION

A. First Embodiment

Figure 1:
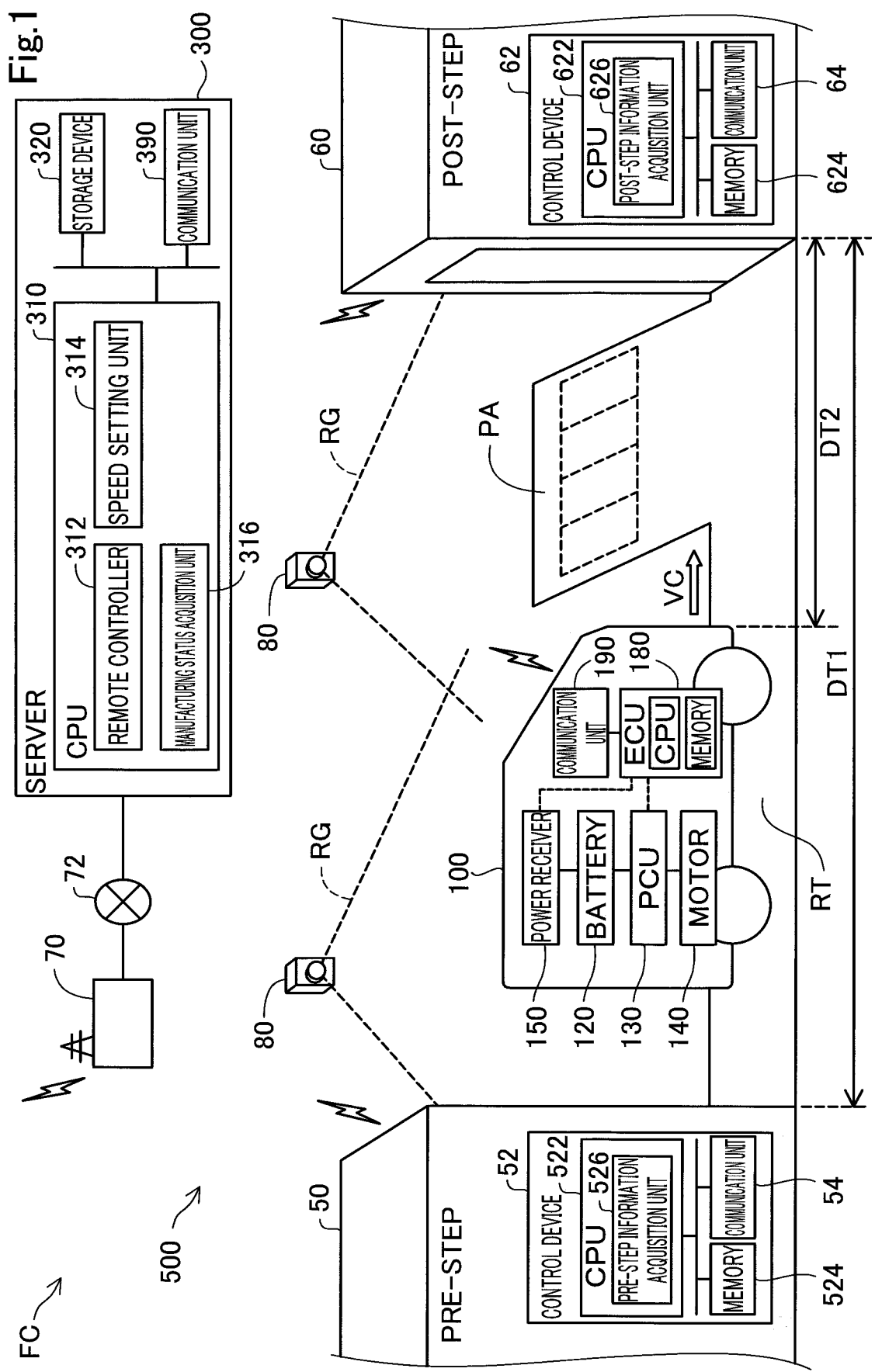
FIG. 1 is an explanatory view showing a schematic configuration of a system according to a first embodiment.

FIG. 1 is an explanatory view showing a schematic configuration of a system 500 according to a first embodiment. The system 500 is used in a factory FC for manufacture of a moving object. The "moving object" means an object capable of moving, and is a vehicle or an electric vertical takeoff and landing aircraft (so-called flying-automobile), for example. The vehicle may be a vehicle to run with a wheel or may be a vehicle to run with a caterpillar track, and may be a two-wheel vehicle, a four-wheel vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate. In the present description, a state finished as a product, and a state as a semifinished product and a state as an item being processed during manufacture are collectively called a "vehicle."

In the present embodiment, a vehicle 100 is a battery electric vehicle (BEV) capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving." In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

The system 500 remotely controls driving of the vehicle 100 to run in the factory FC during a course of manufacture of the vehicle 100. As shown in FIG. 1, the factory FC is provided with a pre-step 50, a post-step 60, a track RT for the vehicle 100, and a parking area PA continuous with the track RT. The track RT is a transport zone for the vehicle 100 connecting the pre-step 50 and the post-step 60 to each other. The factory FC is not limited to one building, to a case where the factory FC is located at one site or one address, etc., but steps in the factory FC during a course of manufacture may extend across a plurality of buildings, a plurality of sites, or a plurality of addresses, for example. "Being in the factory FC" includes a range covering a standby place where, after the vehicle 100 is finished, the finished vehicle 100 is loaded for shipment. "Running of the vehicle 100 in the factory FC" includes a case where the vehicle 100 runs between steps located at a plurality of places and includes a case where the vehicle 100 runs not only on a private road but also on a public road between factories located at a plurality of places for moving between these factories, for example.

The pre-step 50 is an assembly step of installing parts on a vehicle body, for example. The pre-step 50 is not limited to the assembly step but various manufacturing steps are applicable as long as these steps allow the vehicle 100 after being processed by the pre-step 50 to run by remote control. The pre-step 50 includes a pre-step management device 52 for controlling a manufacturing status in the pre-step 50.

The pre-step management device 52 is an information processor including a CPU 522 as a central processing unit, a memory 524 such as a ROM or a RAM, and a communication unit 54 for communication with a server 300. These units are connected to each other via an internal bus or an interface circuit. The CPU 522 executes a program stored in the memory 524 to realize some or all of functions such as a pre-step information acquisition unit 526. The pre-step information acquisition unit 526 acquires a manufacturing status about the vehicle 100 in the pre-step 50 from a camera or a sensor not shown in the drawings provided in the pre-step 50, for example. The pre-step information acquisition unit 526 transmits the acquired manufacturing status in the pre-step 50 to the server 300 via the communication unit 54.

The post-step 60 is an inspection step on the vehicle 100, for example. When permission of loading into the post-step 60 is given, the vehicle 100 having been delivered from the pre-step 50 to become an item to be processed in the post-step 60 is loaded into the post-step 60. After being subjected to the inspection step, the vehicle 100 is finished as a product and runs to the standby place in the factory FC for waiting to be shipped. Then, the vehicle 100 is shipped to a destination country corresponding to identification information about each vehicle 100. The post-step 60 includes a post-step management device 62 for controlling a manufacturing status in the post-step 60.

The post-step management device 62 is an information processor including a CPU 622 as a central processing unit, a memory 624 such as a ROM or a RAM, and a communication unit 64 for communication with the server 300. These units are connected to each other via an internal bus or an interface circuit. The CPU 622 executes a program stored in the memory 624 to realize some or all of functions such as a post-step information acquisition unit 626. The post-step information acquisition unit 626 acquires a manufacturing status about the vehicle 100 in the post-step 60 from a sensor not shown in the drawings provided in the post-step 60, for example. The post-step information acquisition unit 626 transmits the acquired manufacturing status in the post-step 60 to the server 300 via the communication unit 64.

The vehicle 100 includes a communication unit 190, a power receiver 150, a battery 120, a PCU 130, a motor 140, and an electronic control unit (ECU) 180. The communication unit 190 is a radio communication device such as a dongle, for example, installed on the vehicle 100. The communication unit 190 has a communication function of making radio communication via an access point 70 in the factory FC with a device outside the vehicle 100 such as the server 300 connected to a network 72, for example. This causes the vehicle 100 and the server 300 to communicate with each other. The communication unit 190 receives a control signal for remote control over the vehicle 100 from the server 300, and also transmits information such as a state of charge (SOC) of the battery 120 to the server 300. The communication unit 190 may make communication using controller area network (CAN) communication used for control over the vehicle 100 and others. The CAN communication is a communication standard allowing multidirectional transmission or reception. The communication unit 190 may use diagnosis communication. The diagnosis communication is a communication standard allowing request and response to be associated with each other on a one-to-one basis and used for diagnosis of failure, etc.

The power receiver 150 converts alternating-current power supplied from an external power feeder, for example, to direct-current power using a rectifier, and supplies the direct-current power to the battery 120 as a load. The battery 120 is a chargeable secondary battery such as a lithium-ion battery or a nickel-hydrogen battery. The battery 120 is a high-voltage battery of several hundreds of volts, for example, and stores power to be used for running of the vehicle 100. When the battery 120 receives power supplied to the power receiver 150 from the external power feeder and regenerative power generated by the motor 140, the battery 120 is charged.

The motor 140 is an alternating-current synchronous motor, for example, and functions as an electric motor and a generator. When the motor 140 functions as the electric motor, the motor 140 is driven by the power stored in the battery 120 as a power source. Output from the motor 140 is transmitted through a decelerator and an axle to a wheel. During deceleration of the vehicle 100, the motor 140 functions as the generator using the rotation of the wheel to generate regenerative power. The power central unit (PCU) 130 is electrically connected between the motor 140 and the battery 120.

The PCU 130 has an inverter, a boost converter, and a DC/DC converter. The inverter converts direct-current power supplied from the battery 120 to alternating-current power, and supplies the converted alternating-current power to the motor 140. The inverter converts regenerative power supplied from the motor 140 to direct-current power, and supplies the direct-current power to the battery 120. The boost converter boosts a voltage at the battery 120 when the power stored in the battery 120 is supplied to the motor 140. The DC/DC converter steps down the voltage at the battery 120 when the power stored in the battery 120 is supplied to an auxiliary, for example.

The ECU 180 is installed on the vehicle 100 and implements various types of control over the vehicle 100. The ECU 180 functions as a driving controller that implements driving control over the vehicle 100, for example. The "driving control" is adjustment of an acceleration, a speed, and a rudder angle, for example. The ECU 180 includes a memory such as an HDD, an optical recording medium, or a semiconductor memory, a CPU as a central processing unit, and others. The CPU executes various computer programs stored in the memory to realize various functions. Under remote control, the ECU 180 controls each actuator installed on the vehicle 100 in response to a control signal for the remote control received from the server 300 via the communication unit 190. Furthermore, the ECU 180 controls the PCU 130 to control transfer of power between the battery 120 and the motor 140.

The system 500 includes a vehicle detector and the server 300. The vehicle detector acquires the location, orientation, etc. of the vehicle 100. In the present embodiment, the vehicle detector is a camera 80. The camera 80 is fixed at a location allowing the camera 80 to capture images of the track RT, the parking area PA, and the running vehicle 100. The camera 80 acquires images allowing the location of the vehicle 100 to be checked relative to the track RT and the parking area PA. The images captured by the camera 80 are used for remote control over the vehicle 100. This configuration makes it possible to implement automatic running of the vehicle 100 by remote control without using a detector installed on the vehicle 100 that may be a camera, a millimeter wave radar, or an LiDAR. Meanwhile, for a purpose such as prevention of collision during remote control by the system 500, a detector installed on the vehicle 100 may be used supplementarily. As long as the vehicle detector is installed on the factory FC and is capable of acquiring the location or orientation of the vehicle 100, the vehicle detector to be used may be various types of detectors such as an infrared sensor, a laser sensor, an ultrasonic sensor, a millimeter wave radar, and an LiDAR, for example, other than the camera 80.

The server 300 includes a CPU 310 as a central processing unit, a storage device 320, and a communication unit 390. These units are connected to each other via an internal bus or an interface circuit, for example. The communication unit 390 is a circuit for communication with the vehicle 100, the pre-step management device 52, the post-step management device 62, and others via the network 72.

The storage device 320 is a RAM, a ROM, a hard disk drive (HDD), or a solid state drive (SSD), for example. The storage device 320 stores various programs for realizing functions provided in the present embodiment. The CPU 310 executes a computer program stored in the storage device 320. This causes the CPU 310 to function as a remote controller 312, a speed setting unit 314, a manufacturing status acquisition unit 316, and others. Some or all the functions of the remote controller 312, the speed setting unit 314, and the manufacturing status acquisition unit 316 may be configured by a hardware circuit. The storage device 320 has a readable and writable area for storage of data acquired from the vehicle 100, acquired from each step, and others.

The manufacturing status acquisition unit 316 acquires a manufacturing status in each step in the factory FC. The "manufacturing status" means a status about the progress of a processing in a step. The manufacturing status includes at least a delay status in each step. The manufacturing status may further include the number of items being processed existing in each step, the number of products being processed, a manufacturing time required for a processing in a step, a start time point and a finish time point of a processing in each step, a scheduled manufacture volume per day, and a target manufacturing time in a step for manufacturing one vehicle 100. The manufacturing status may include target values of these items and actual statuses relative to the corresponding target values. The "manufacturing time" includes a time from start of a processing in a step to finish of the processing, and a time to a present moment during a process in a step after the processing is started. The manufacturing status acquisition unit 316 may acquired a manufacturing status in each step from a production control system that collectively controls manufacturing statuses in the steps in the factory FC.

The manufacturing status acquisition unit 316 acquires a manufacturing status based on each vehicle identification information. The "vehicle identification information" means various types of information with which the vehicle 100 is individually identifiable. The vehicle identification information includes ID information given to each vehicle 100, specification information about the vehicle 100 such as a vehicle type, a color, and a shape, production control information such as the name of a step in which the vehicle 100 is being processed, for example. The vehicle identification information may be acquired from an RF tag given to the vehicle 100, for example. In the case of manufacture of a plurality of the vehicles 100 based on a group such as one lot, a lot number may be used as the vehicle identification information. Furthermore, the vehicle identification information may be location information about the vehicle 100 in the factory FC such as the name of a step in which the vehicle 100 is being processed, a coordinate on the track RT, or a coordinate in the factory FC.

The target manufacturing time is a time set for manufacturing the vehicle 100 efficiently and is set for each step, for example. The target manufacturing time is calculable using a scheduled manufacture volume per day by a step and operating hours per day in the step, for example. The target manufacturing time may also be called "takt time." A scheduled start time point and a scheduled finished time point of a processing in each step are settable using the target manufacturing time.

In order to improve production efficiency, timing of loading of the vehicle 100 into the post-step 60 preferably conforms to the scheduled start time point derived from the target manufacturing time. For example, if arrival of the vehicle 100 is later the scheduled start time point, missing of the vehicle 100 might occur. If arrival of the vehicle 100 is earlier than the scheduled start time point, a surplus of the vehicle 100 might occur. If a time required for a processing in the post-step 60 deviates from the target manufacturing time, the scheduled start time point might be changed. Thus, in this case, time point of arrival of the vehicle 100 at the post-step 60 is also preferably changed. For example, the occurrence of delay from the target manufacturing time or the occurrence of abnormality in the post-step 60 might cause delay in scheduled start time point of the processing in the post-step 60 on a next vehicle 100. In this case, it is preferable that arrival time point of the vehicle 100 be adjusted in response to a delay time by adjusting a running speed in the transport zone, for example. The manufacturing status acquisition unit 316 acquires manufacturing statuses in the post-step 60 sequentially, for example from the post-step management device 62, and acquires scheduled arrival time point when the vehicle 100 to be loaded next into the post-step 60 is to arrive at the post-step 60.

The speed setting unit 314 sets a running speed VC of the vehicle 100 during running on the track RT. The running speed VC is settable using the scheduled arrival time point acquired by the manufacturing status acquisition unit 316. For example, the speed setting unit 314 calculates an average speed of the vehicle 100 during running on the track RT as the running speed VC of the vehicle 100. With a difference between a time point at which the vehicle 100 starts to run and the scheduled arrival time point defined as a running time, the average speed is calculated by dividing a distance DT1 of the track RT shown in FIG. 1 by the running time. If the vehicle 100 is already running on the track RT like in the illustration in FIG. 1, the speed setting unit 314 uses a residual distance DT2 and calculates a running speed during running along the residual distance DT2 as the running speed VC. On the assumption that the vehicle 100 is to arrive at the post-step 60 on the scheduled arrival time point, various types of information about the speed of the vehicle 100 such as a maximum speed or an acceleration of the vehicle 100 may be used as the running speed VC of the vehicle 100, instead of the average speed. Running of the vehicle 100 at the running speed VC permits temporary stop of the vehicle 100 on the track RT. For example, on the assumption that the vehicle 100 is to arrive at the post-step 60 on the scheduled arrival time point, running and stop of the vehicle 100 may be repeated.

If a manufacturing time in the post-step 60 is equal to the target manufacturing time, the speed setting unit 314 sets the running speed VC of the vehicle 100 to run to the post-step 60 to a reference speed defined in advance. If the scheduled arrival time point is changed in response to the occurrence of deviation from the target manufacturing time in the post-step 60, the speed setting unit 314 changes the running speed VC of the vehicle 100 in response to the scheduled arrival time point as changed. For example, if the manufacturing time in the post-step 60 is longer than the target manufacturing time, the running speed VC of the vehicle 100 is set to a speed lower than the reference speed. If the manufacturing time in the post-step 60 is shorter than the target manufacturing time, the running speed VC of the vehicle 100 may be set to a speed higher than the reference speed. As a result, it becomes possible for the vehicle 100 to arrive at the post-step 60 in conformity with the scheduled start time point of the processing in the post-step 60. If the manufacturing time in the post-step 60 is shorter than the target manufacturing time, the running speed VC of the vehicle 100 may be set to the reference speed.

The remote controller 312 implements automatic running of the vehicle 100. The remote controller 312 causes the vehicle 100 to run at the running speed set by the speed setting unit 314. The remote controller 312 transmits a control signal requesting remote control over the vehicle 100 to the vehicle 100 via the communication unit 390. When the vehicle 100 accepts the request for remote control, the ECU 180 realizes driving control responsive to the control signal. As a result, the vehicle 100 runs automatically.

FIG. 2A is a flowchart showing a running method of causing the vehicle 100 to run realized by the server 300. In step S1, the remote controller 312 acquires a vehicle location information using detection result output from an external sensor. The vehicle location information is locational information as a basis for generating a running control signal. In the present embodiment, the vehicle location information includes the location and position of the vehicle 100 in a reference coordinate system of the factory FC. In the present embodiment, the reference coordinate system of the factory is a global coordinate system and a location in the factory can be expressed by X, Y, and Z coordinates in the global coordinate system. The external sensor is a sensor located outside the vehicle 100. In the present embodiment, the camera 80 that is the vehicle detector is used as the external sensor. The detection result is an image captured by the camera 80. The location of the camera 80 in the factory FC is adjusted in advance. The remote controller 312 acquires the vehicle location information using the captured image acquired from the camera 80.

More specifically, in step S1, the remote controller 312 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system, thereby acquiring the location of the vehicle 100. The outer shape of the vehicle 100 in the captured image may be detected by inputting the captured image to a detection model using artificial intelligence, for example. A detection model is prepared in the system 500 or outside the system 500. The detection model is stored in advance in the storage device 320, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label.

In step S1, the remote controller 312 can acquire the orientation of the vehicle 100 through estimation based on the direction of a motion vector of the vehicle 100 detected from change in location of a feature point of the vehicle 100 between frames of the captured images using optical flow process, for example. The orientation of the vehicle 100 may be calculated using output result from an internal sensor that may be an acceleration sensor or a yaw rate sensor mounted on the vehicle 100, for example. The internal sensor is a sensor mounted on the vehicle 100.

In step S2, the remote controller 312 determines a target location to which the vehicle 100 is to move next. In the present embodiment, the target location is expressed by X, Y, and Z coordinates in the global coordinate system of the factory FC. The storage device 320 of the server 300 contains a reference route stored in advance as a route along which the vehicle 100 is to run. In the present embodiment, a target route described later corresponds to the reference route. The route is expressed by a node indicating a departure place, a node indicating a way point, a node indicating a destination, and a link connecting nodes to each other. The remote controller 312 determines the target location to which the vehicle 100 is to move next using the vehicle location information and the reference route. The remote controller 312 determines the target location on the reference route ahead of a current location of the vehicle 100.

In step S3, the remote controller 312 generates a running control signal for causing the vehicle 100 to run to the determined target location. In the present embodiment, the running control signal includes an acceleration and a steering angle of the vehicle 100 as parameters. The remote controller 312 calculates a current speed of the vehicle 100 from transition of the location of the vehicle 100, and makes comparison between the calculated current speed and a target speed of the vehicle 100 determined in advance. The target speed is determined based on the running speed VC set by the speed setting unit 314 described above. If the current speed is lower than the target speed, the remote controller 312 generally determines an acceleration in such a manner as to accelerate the vehicle 100. If the current speed is higher than the target speed as, the remote controller 312 generally determines an acceleration in such a manner as to decelerate the vehicle 100. If the vehicle 100 is on the reference route, the remote controller 312 determines a steering angle and an acceleration in such a manner as to prevent the vehicle 100 from deviating from the reference route. If the vehicle 100 is not on the reference route, in other words, if the vehicle 100 deviates from the reference route, the remote controller 312 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S4, the remote controller 312 transmits the generated running control signal to the vehicle 100. The remote controller 312 repeats the acquisition of vehicle location information, the determination of a target location, the generation of a running control signal, the transmission of the running control signal, and others in a predetermined cycle.

In step S5, the driving controller of the vehicle 100, namely, the ECU 180 receives the running control signal from the remote controller 312. In step S6, the ECU 180 controls an actuator using the received running control signal, thereby causing the vehicle 100 to run at the acceleration and the steering angle indicated by the running control signal. The ECU 180 repeats the reception of a running control signal and the control over the actuator in a predetermined cycle. By causing the vehicle 100 to run by remote control as described above, it becomes possible to move the vehicle 100 without using a transport unit such as a crane or a conveyor.

Figure 2B:
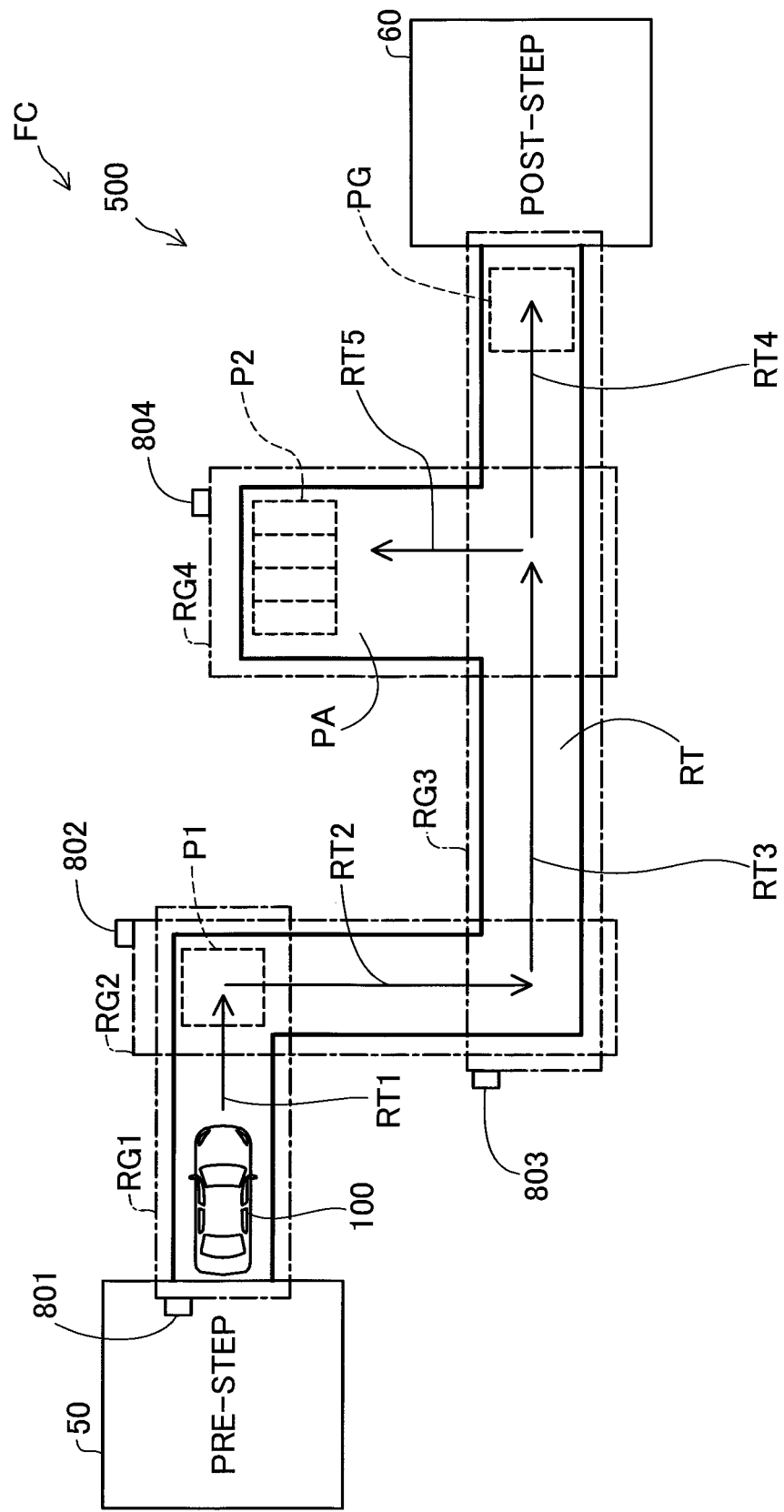
FIG. 2B is an explanatory view showing automatic driving control over the vehicle by remote control by a remote controller.

FIG. 2B is an explanatory view showing automatic driving control over the vehicle 100 by remote control by the remote controller 312. In the illustration in FIG. 2B, the track RT includes a first track RT1, a second track RT2, a third track RT3, and a fourth track RT4 continuous with each other. The first track RT1 and the second track RT2 are connected to each other across a right-angled curve. The parking area PA is connected between the third track RT3 and the fourth track RT4. In normal time point, the remote controller 312 causes the vehicle 100 to run along the track RT to a loading location PG for loading into the post-step 60.

As shown in FIG. 2B, the camera 80 as the vehicle detector acquires images of the vehicle 100 on the track RT and in the parking area PA viewed from above. The number of the cameras 80 is set by giving consideration to angles of view of the cameras 80 to a number allowing imaging of the track RT and the parking area PA entirely. In the illustration in FIG. 2B, the camera 80 includes a camera 801 allowing imaging of a range RG1 covering the first track RT1 entirely, a camera 802 allowing imaging of a range RG2 covering the second track RT2 entirely, a camera 803 allowing imaging of a range RG3 covering the third track RT3 and the fourth track RT4 entirely, and a camera 804 allowing imaging of a range RG4 covering the parking area PA entirely. The camera 80 may acquire not only an image captured from above the vehicle 100 but also an image captured from the front, back, or side of the vehicle 100, for example. Cameras for acquiring such images may be used freely in combination.

The track RT has a target route set in advance as a route along which the vehicle 100 is to run. The remote controller 312 causes the ECU 180 to implement driving control over the vehicle 100 while analyzing images of the track RT and the vehicle 100 at a predetermined time point interval acquired by the camera 80. The remote controller 312 sequentially adjusts the location of the vehicle 100 relative to the target route, thereby allowing the vehicle 100 to run along the target route. For the remote control, an image of the entire vehicle 100 may be used or an image of a part of the vehicle 100 such as an alignment mark given to the vehicle 100 may be used.

The cameras 80 are configured in such a manner that, at a connecting location between tracks such as a location P1 shown in FIG. 2B, the angles of view of the cameras 80 corresponding to the respective connected tracks overlap each other. In the example of the location P1, the angle of view of the camera 801 corresponding to the first track RT1 and the angle of view of the camera 802 corresponding to the second track RT2 overlap each other. The vehicle 100 having been delivered from the pre-step 50 runs to the location P1 by remote control using an image captured by the camera 801. When the vehicle 100 arrives at the location P1, switch is made to remote control using a captured image acquired by the camera 802 instead of the camera 801 and the vehicle 100 runs along the second track RT2. Likewise, an image captured by the camera 803 is used for running along the third track RT3 and the fourth track RT4, and an image captured by the camera 804 is used for running in the parking area PA. In this way, the remote controller 312 implements remote control over the vehicle 100 while switching a captured image to be analyzed properly based on the range of the track RT.

The remote controller 312 allows the vehicle 100 to retreat from the track RT by causing the vehicle 100 to run from the track RT to the parking area PA by remote control. The parking area PA may be a vehicle standby location where the vehicle 100 is on standby waiting to be loaded into the post-step 60. The remote controller 312 further allows the vehicle 100 having run to the parking area PA to be parked at a parking location P2 in the parking area PA. The stop of the vehicle 100 at the parking location P2 and the standby state of the vehicle 100 thereat may be notified to an operator, for example. The notification may be made on a display screen such as a display of the post-step management device 62 or by voice through a speaker installed on the vehicle 100, for example.

Figure 3:
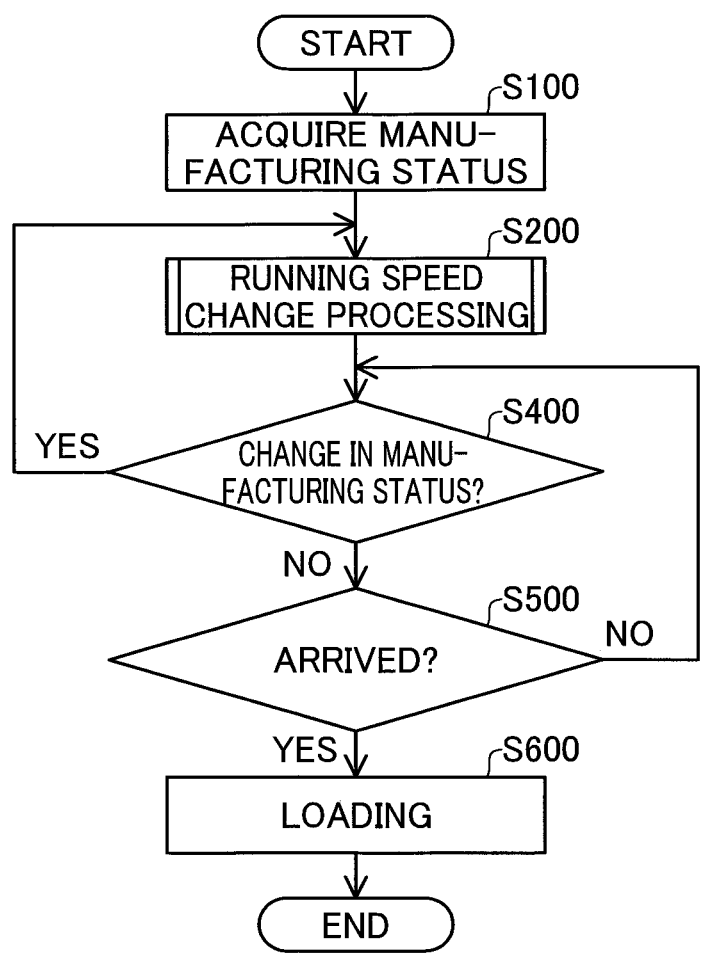
FIG. 3 is a flowchart showing a method of manufacturing a vehicle.

FIG. 3 is a flowchart showing a method of manufacturing the vehicle 100 implemented by the system 500 according to the present embodiment. This flow is started by the manufacturing status acquisition unit 316 having detected completion of the processing in the pre-step 50 or request from the post-step 60 to load the vehicle 100 based on a manufacturing status.

In step S100, the manufacturing status acquisition unit 316 acquires a manufacturing status in the post-step 60 from the post-step management device 62. In step S200, the speed setting unit 314 performs a running speed change processing using the acquired manufacturing status in the post-step 60. The manufacturing status acquisition unit 316 extracts a scheduled arrival time point when the vehicle 100 is to arrive at the post-step 60 as a running destination from the acquired manufacturing status. The speed setting unit 314 changes a running speed using the extracted scheduled arrival time point so as to realize arrival in conformity with the scheduled arrival time point.

In step S400, the manufacturing status acquisition unit 316 acquires a manufacturing status in the post-step 60 each time a predetermined time has elapsed, for example, to judge whether there is a change in the manufacturing status in the post-step 60. In the present embodiment, the manufacturing status acquisition unit 316 judges whether there is a change in scheduled loading time point of loading of the vehicle 100 into the post-step 60. If there is no change in the scheduled loading time point (S400: NO), the processing moves to step S500. Step S400 is implementable both in the case where the vehicle 100 is running by remote control and the case where the vehicle 100 is stopping. If there is a change in the scheduled loading time point (S400: YES), the processing moves to step S200. In this configuration, it is possible to change the running speed VC of the vehicle 100 properly in response to the change in the manufacturing status in the post-step 60. As a result, even if there is a change in a manufacturing time in the post-step 60, timing of loading of the vehicle 100 into the post-step 60 is still changeable to proper timing, making it possible to suppress or prevent reduction in production efficiency.

In step S500, it is judged whether the vehicle 100 has arrived at the loading location PG for loading into the post-step 60. If the vehicle 100 has not arrived at the loading location PG (S500: NO), the processing returns to step S400. If the vehicle 100 has arrived at the loading location PG (S500: YES), the processing moves to step S600. In step S600, the remote controller 312 causes the vehicle 100 to run by remote control to load the vehicle 100 into the post-step 60. Step S600 may be performed after permission of loading is accepted from the post-step 60. When loading of the vehicle 100 into the post-step 60 is finished, the processing is completed.

Figure 4:
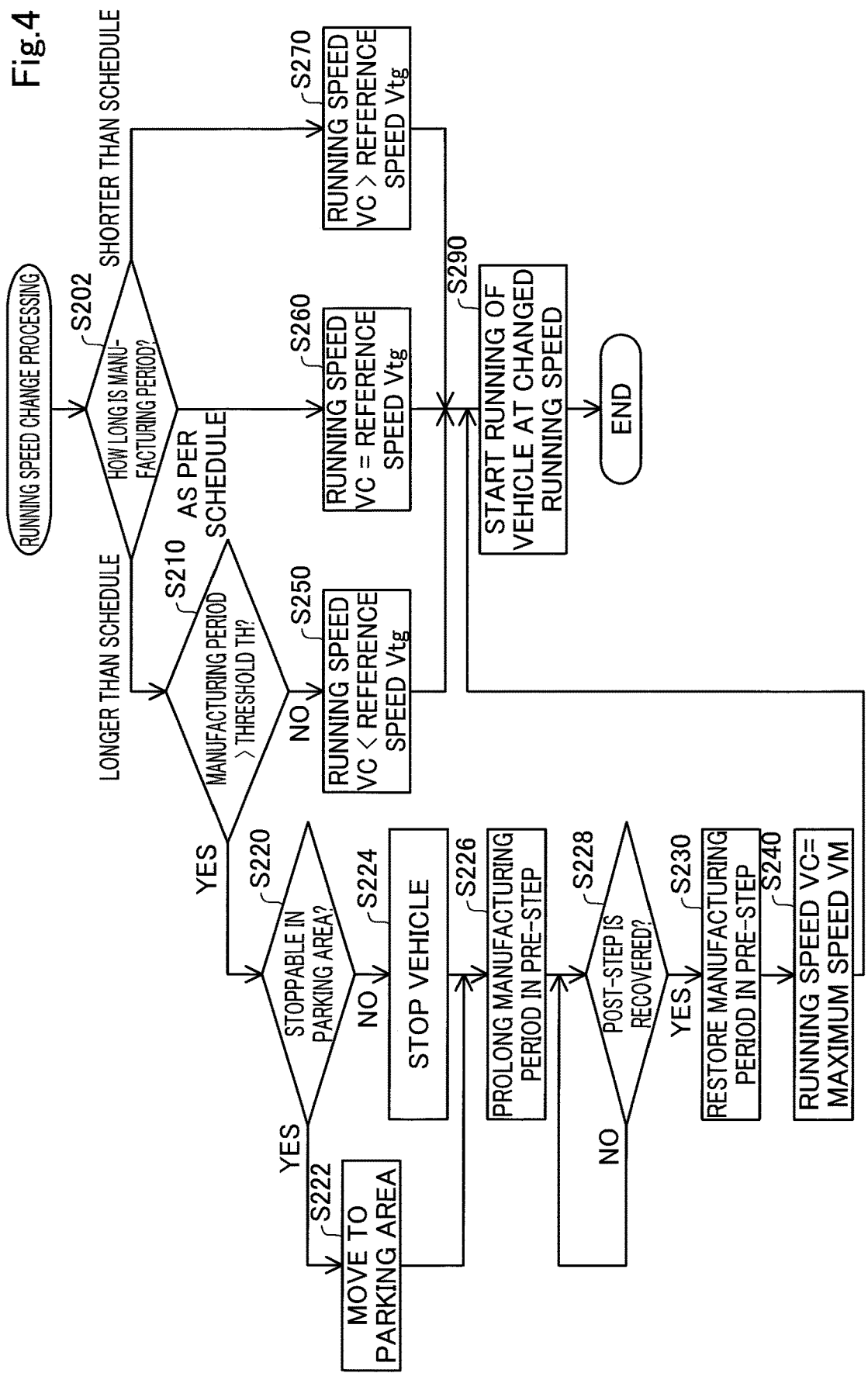
FIG. 4 is a flowchart showing a procedure of a running speed change processing.

FIG. 4 is a flowchart showing a procedure of the running speed change processing. In step S202, the speed setting unit 314 checks a manufacturing time in the post-step 60 based on the acquired manufacturing status. More specifically, the speed setting unit 314 compares the manufacturing time in the post-step 60 and a target manufacturing time to judge whether the manufacturing time in the post-step 60 deviates from the target manufacturing time. If the manufacturing time in the post-step 60 is equal to the target manufacturing time, specifically, if the manufacturing time in the post-step 60 is as per schedule (S202: as per schedule), the processing moves to step S260. In step S260, the speed setting unit 314 sets the running speed VC of the vehicle 100 to a predetermined reference speed Vtg. The reference speed Vtg is a speed for causing the vehicle 100 to arrive on scheduled start time point in the case in which the manufacturing time in the post-step 60 is equal to the target manufacturing time. If the manufacturing time in the post-step 60 is shorter than the target manufacturing time (S202: shorter than schedule), the processing moves to step S270. In step S270, the speed setting unit 314 sets the running speed VC of the vehicle 100 to a speed higher than the reference speed Vtg. As a result, it becomes possible for the vehicle 100 to arrive at the post-step 60 in conformity with the scheduled start time point set earlier than schedule.

If the manufacturing time in the post-step 60 is longer than the target manufacturing time (S202: longer than schedule), the processing moves to step S210. In step S210, the speed setting unit 314 judges whether the manufacturing time is longer than a threshold TH. The threshold TH is used for judging whether the delay in the manufacturing time having occurred becomes cancelable by changing a running speed of the vehicle 100 or changing a manufacturing time in the pre-step 50, for example. The threshold TH may also be said to be a stop judgment time used for judging whether the vehicle 100 is to be stopped. The threshold TH is settable using a time required for the vehicle 100 to run along the track RT at the reference speed Vtg, for example. With the manufacturing time longer than the threshold TH, even if the running speed of the vehicle 100 is changed or the manufacturing time in the pre-step 50 is changed, the vehicle 100 having been delivered from the pre-step 50 might retain on the track RT.

If the manufacturing time is equal to or shorter than the threshold TH (step S210: NO), the processing moves to step S250. In step S250, the speed setting unit 314 sets the running speed VC to a speed lower than the reference speed Vtg. As a result, it becomes possible for the vehicle 100 to arrive at the post-step 60 in conformity with the scheduled start time point set later than schedule. If the manufacturing time is longer than the threshold TH (step S210: YES), the processing moves to step S220.

In step S220, the remote controller 312 judges whether it is possible to stop the vehicle 100 at the parking location P2 in the parking area PA. Whether the vehicle 100 is stoppable may be judged by analyzing an image of the parking area PA captured by the camera 804 shown in FIG. 2B and judging whether there is a vacancy at the parking location P2, for example. The judgment may be made by installing a detector for detecting the vehicle 100 on the parking location P2 and using result of the detection therefrom. If it is possible to stop the vehicle 100 in the parking area PA (S220: YES), the remote controller 312 moves the vehicle 100 to the parking area PA by remote control and stops the vehicle 100 at the parking location P2. By doing so, it becomes possible to suppress or prevent retention of the vehicle 100 on the track RT having been delivered from the pre-step 50. If it is not possible to stop the vehicle 100 in the parking area PA (S220: NO), the remote controller 312 stops the vehicle 100 temporarily on the track RT.

In step S226, the speed setting unit 314 sets a manufacturing time in the pre-step 50 longer than a target manufacturing time in the pre-step 50. The manufacturing time in the pre-step 50 may be prolonged by a method such as changing the target manufacturing time in the pre-step 50 to a longer time, transmitting a control signal for delaying the processing to a control device controlling the equipment in the pre-step 50, or making a notification to an operator of the pre-step 50 for prompting the operator to conduct work of delaying the processing, for example.

In step S228, the remote controller 312 is on standby waiting for permission of loading into the post-step 60. If loading into the post-step 60 is permitted (S228: YES), the processing moves to step S230. In step S230, the speed setting unit 314 changes the delayed manufacturing time in the pre-step 50 back to an initial time. Like in step S226, for "changing the manufacturing time in the pre-step 50 back to the initial time," the target manufacturing time in the pre-step 50 may be changed, a control signal may be transmitted to the pre-step 50, or a notification may be made to the operator of the pre-step 50, for example. In step S240, the speed setting unit 314 sets the running speed VC of the vehicle 100 to a maximum speed VM within a range allowing the vehicle 100 to run safely on the track RT or in the parking area PA. This makes it possible to contribute to resolving of the delay in the manufacturing time in the post-step 60. In step S290, the remote controller 312 causes the vehicle 100 to run by remote control toward the post-step 60 at the running speed VC set in each of the foregoing steps.

As described above, the system 500 of the present embodiment includes the remote controller 312 that controls the vehicle 100 remotely, the manufacturing status acquisition unit 316 that acquires information about a manufacturing status in the factory FC, and the speed setting unit 314 that sets a moving speed of the vehicle 100 using the acquired manufacturing status in the factory FC. The system 500 of the present embodiment allows the running speed VC of the vehicle 100 to be changed to a running speed appropriate for the manufacturing status in the factory FC. Thus, it is possible to load the vehicle 100 into each step with timing appropriate for a manufacturing status in each step, allowing the vehicle 100 to be manufactured efficiently.

In the system 500 of the present embodiment, the manufacturing status acquisition unit 316 acquires information as the manufacturing status that is about a manufacturing time in the post-step 60 as a destination of running of the vehicle 100. The speed setting unit 314 sets the running speed VC of the vehicle 100 to run to the post-step 60 using the acquired information about the manufacturing time in the post-step 60. Thus, it is possible to load the vehicle 100 into the post-step 60 with timing conforming to a target manufacturing time in the post-step 60, allowing the vehicle 100 to be manufactured efficiently.

In the system 500 of the present embodiment, if the manufacturing time in the post-step 60 is equal to the target manufacturing time, the speed setting unit 314 sets the running speed VC of the vehicle 100 to run to the post-step 60 to the predetermined reference speed Vtg. If the manufacturing time in the post-step 60 is longer than the target manufacturing time, the speed setting unit 314 sets the running speed VC of the vehicle 100 to run to the post-step 60 to a speed lower than the reference speed Vtg. Thus, it is possible to load the vehicle 100 into the post-step 60 with proper timing conforming to change in the target manufacturing time in the post-step 60, allowing the vehicle 100 to be manufactured efficiently.

In the system 500 of the present embodiment, if the manufacturing time in the post-step 60 is longer than the predetermined threshold TH that is longer than the target manufacturing time, the remote controller 312 stops the vehicle 100. If the manufacturing time in the post-step 60 is longer than the threshold TH, stopping flow of a product makes it possible to suppress or prevent retention of the vehicle 100 in the transport zone such as the track RT having been delivered from the pre-step 50. This reduces excess in items to be processed in the post-step 60, making it possible to suppress reduction in production efficiency of the vehicle 100.

In the system 500 of the present embodiment, if the manufacturing time in the post-step 60 is longer than the predetermined threshold TH that is longer than the target manufacturing time, the remote controller 312 causes the vehicle 100 to run to the predetermined parking area PA and stops the vehicle 100 in the parking area PA. This makes it possible to suppress or prevent a problem that the vehicle 100 retains on the track RT and hinders running of another vehicle 100.

In the system 500 of the present embodiment, if the parking area PA is unavailable, the remote controller 312 stops the vehicle 100 without causing the vehicle 100 to run to the parking area PA. This makes it possible to prevent the vehicle 100 from running unnecessarily to the parking area PA.

In the system 500 of the present embodiment, the manufacturing status acquisition unit 316 acquires the scheduled loading time point when the vehicle 100 becomes loadable into the post-step 60 as the information about the manufacturing time in the post-step 60, and the speed setting unit 314 sets the running speed VC of the vehicle 100 to run to the post-step 60 in such a manner that arrival timing of arrival of the vehicle 100 at the post-step 60 conforms to the acquired scheduled loading time point. Thus, it is possible to load the vehicle 100 into the post-step 60 in conformity with the scheduled loading time point of loading into the post-step 60, allowing the vehicle 100 to be manufactured more efficiently.

In the system 500 of the present embodiment, if the manufacturing time in the post-step 60 is longer than the target manufacturing time, the speed setting unit 314 sets a manufacturing time in the pre-step 50 longer than a target manufacturing time in the pre-step 50. Thus, on the occurrence of delay in manufacture in the post-step 60, delivery of the vehicle 100 from the pre-step 50 is delayed. This suppresses excessive increase in items being processed in the post-step 60, making it possible to suppress or prevent retention of the vehicle 100 on the track RT having been delivered from the pre-step 50. As a result, it is possible to suppress or prevent stop of the processing in the pre-step 50 caused by stop of delivery from the pre-step 50.

B. Second Embodiment

Figure 5:
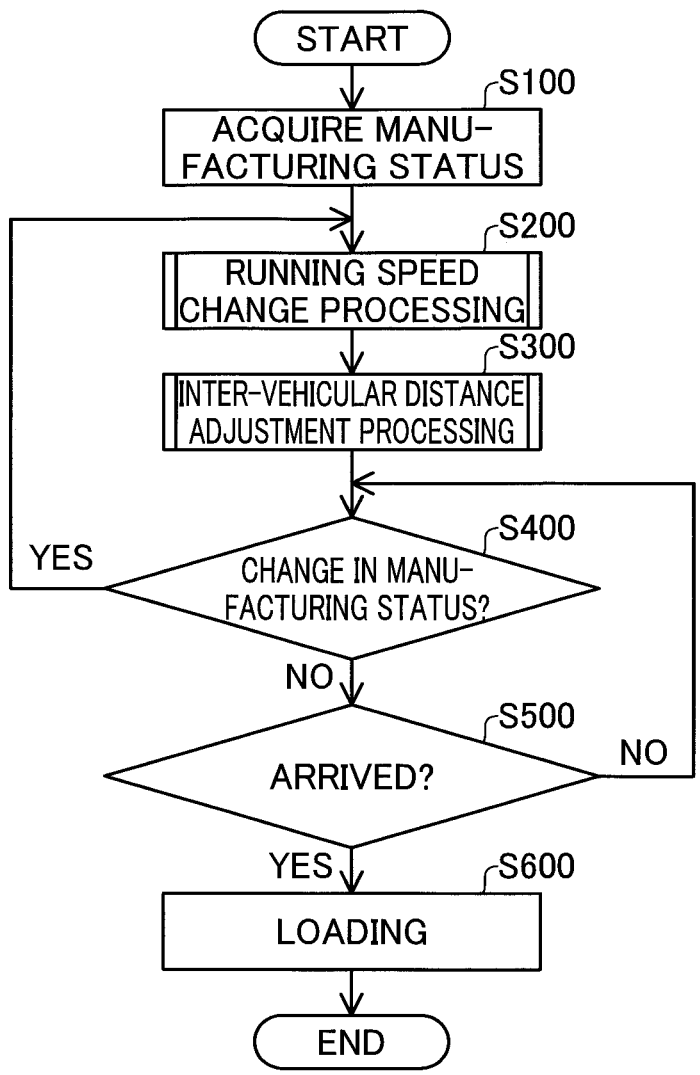
FIG. 5 is a flowchart showing a method of manufacturing a vehicle according to a second embodiment.

FIG. 5 is a flowchart showing a method of manufacturing a vehicle 100 implemented by a system 500 according to a second embodiment. The system 500 of the second embodiment has a functional configuration same as that of the system 500 of the first embodiment. This flow differs from the flow of the first embodiment shown in FIG. 3 in that it further includes step S300 between step S200 and step S400. In step S300, an inter-vehicular distance adjustment processing is performed.

Figure 6:
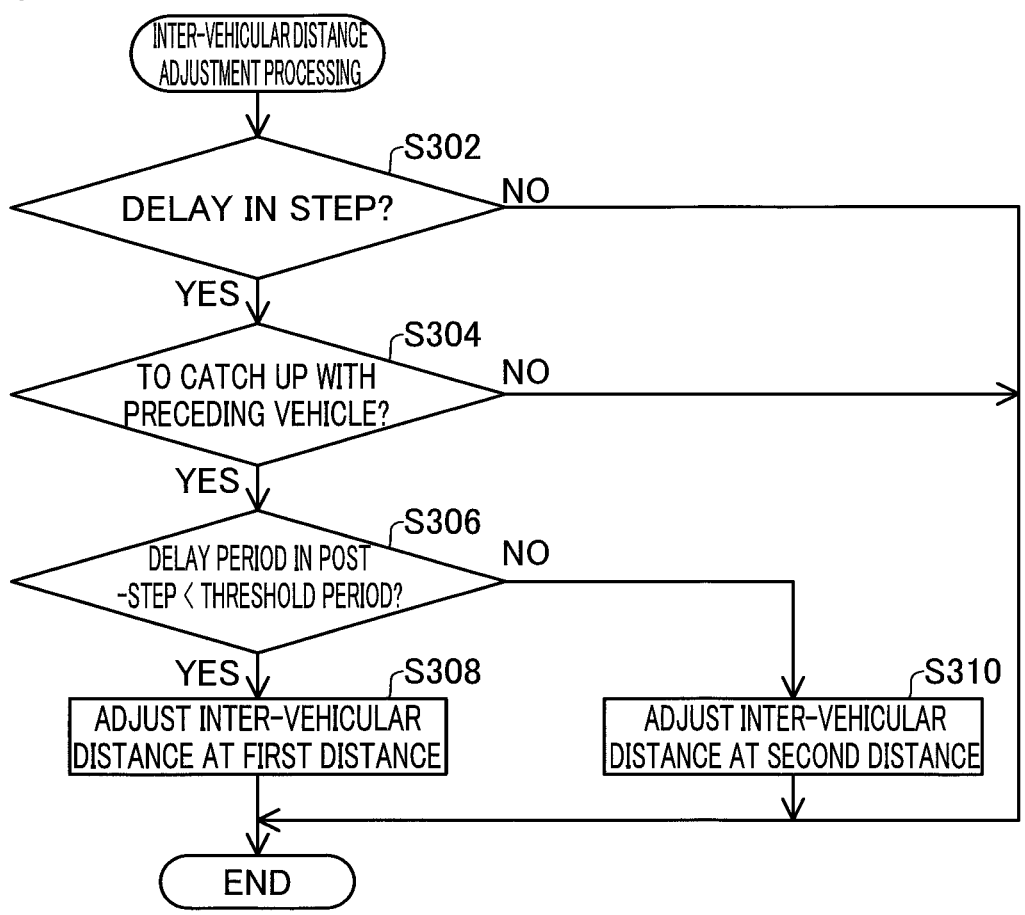
FIG. 6 is a flowchart showing a processing routine of an inter-vehicular distance adjustment processing.

FIG. 6 is a flowchart showing a processing routine of the inter-vehicular distance adjustment processing. In the following description, the vehicle 100 having been delivered from the pre-step 50 and to be subjected to implementation of this flow will also be called a "current vehicle 100." The vehicle 100 having been delivered from the pre-step 50 before the current vehicle 100 and having started for the post-step 60 will also be called a "preceding vehicle."

In step S302, the speed setting unit 314 judges whether there is delay in a processing in the post-step 60 based on a manufacturing status acquired by the manufacturing status acquisition unit 316 in step S100. If there is no delay in the processing in the post-step 60 so a running speed of the preceding vehicle is not slowed down (S302: NO), the processing is finished. If the processing in the post-step 60 is delayed so the running speed of the preceding vehicle is slowed down (S302: YES), the processing moves to step S304. The speed setting unit 314 may judge whether a manufacturing time in the pre-step 50 has been shortened instead of delay in the processing in the post-step 60. In another case, instead of or together with the delay in the processing in the post-step 60, it may be judged whether the running speed of the vehicle 100 has been changed to a lower speed in step S200. Alternatively, step S302 may be omitted and step S304 may be performed on every vehicle 100.

In step S304, the speed setting unit 314 judges whether the current vehicle 100 catches up with the preceding vehicle before the current vehicle 100 arrives at the post-step 60. More specifically, the speed setting unit 314 acquires a running speed of the preceding vehicle set last time, and compares the acquired running speed of the preceding vehicle with a running speed of the current vehicle 100 set this time. If the running speed of the current vehicle 100 is higher than the running speed of the preceding vehicle, it is judged whether the current vehicle 100 catches up with the preceding vehicle before the preceding vehicle running at the set running speed along the residual distance DT2 arrives at the loading location PG. If the current vehicle 100 is judged not to catch up with the preceding vehicle (S304: NO), the processing is finished. If the current vehicle 100 is judged to catch up with the preceding vehicle (S304: YES), the processing moves to step S306.

In step S306, the speed setting unit 314 compares an acquired delay time in the post-step 60 with a predetermined threshold time. The "delay time" means a length of time corresponding to delay from a target manufacturing time. The threshold time is used for setting a distance between the current vehicle 100 and the preceding vehicle in a traveling direction (hereinafter also called an "inter-vehicular distance"). Considering that the inter-vehicular distance is controlled remotely, the inter-vehicular distance is set to a distance that avoids collision between the vehicle 100 and the preceding vehicle, for example, to cause no influence on product quality and allows ensuring of safety of the vehicle 100 during running.

If the delay time is shorter than the threshold time (S306: YES), the remote controller 312 causes the vehicle 100 to run by remote control in such a manner that the inter-vehicular distance from the preceding vehicle becomes a predetermined first distance. In the present embodiment, the first distance is set to one meter. However, the first distance may be set to any distance such as 100 millimeters, 500 millimeters, or 3 meters. The first distance may be set using a parameter other than a distance such as an entire length or half of the entire length of the vehicle 100 recognized from an image captured by the camera 80, or the number of pixels in the captured image, for example. If the delay time is equal to the threshold time or if the delay time is longer than the threshold time (S306: NO), the remote controller 312 adjusts the inter-vehicular distance at a predetermined second distance. The second distance is shorter than the first distance. In the present embodiment, the second distance is set to 500 millimeters. On the assumption that the second distance is shorter than the first distance, the second distance may be set to any distance such as 50 millimeters, 100 millimeters, or one meter. Like the first distance, the second distance may be set using a parameter other than a distance.

The remote controller 312 adjusts the inter-vehicular distance by analyzing an image of the vehicle 100 acquired by the camera 80. With this configuration, it is possible to adjust the inter-vehicular distance without using a sensor or the like for detecting the inter-vehicular distance that might be installed on the vehicle 100. However, the remote control may be assisted by additionally utilizing positioning result, etc. obtained using a sensor of the vehicle 100 or a global navigation satellite system (GNSS), for example.

Figure 7:
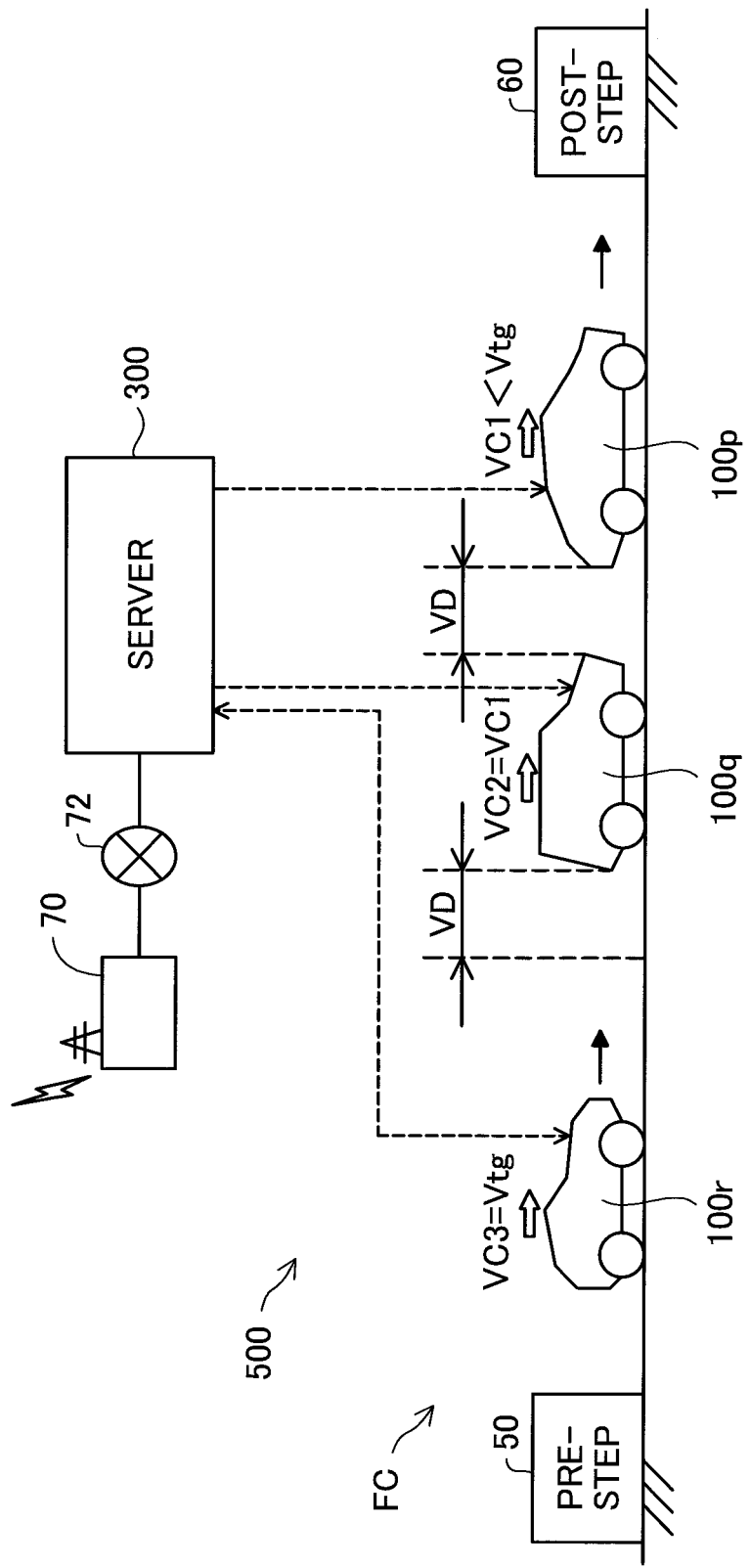
FIG. 7 is an explanatory view showing an outline of the inter-vehicular distance adjustment processing.

FIG. 7 is an explanatory view showing an outline of the inter-vehicular distance adjustment processing. The illustration in FIG. 7 shows the current vehicle 100 defined as a vehicle 100r, a preceding vehicle 100q, and a vehicle 100p having been delivered from the pre-step 50 before the preceding vehicle 100q. In the illustration in FIG. 7, the vehicle 100p as a leading vehicle is running on the track RT at a running speed VC1 lower than the reference speed Vtg. The preceding vehicle 100q has already been subjected to the inter-vehicular distance adjustment processing and is running at a running speed VC2 equal to the running speed VC1 of the vehicle 100p while maintaining an inter-vehicular distance from the vehicle 100p at a target distance VD.

The remote controller 312 causes the current vehicle 100r having been delivered from the pre-step 50 to run at a running speed VC3 equal to the reference speed Vtg. When timing comes for the current vehicle 100r to catch up with the preceding vehicle 100q, the current vehicle 100r starts to be decelerated in such a manner that an inter-vehicular distance from the preceding vehicle 100q becomes the target distance VD. When the inter-vehicular distance reaches the target distance VD, the running speed VC3 of the current vehicle 100r becomes equal to the running speed VC2 of the preceding vehicle 100q. As a result, the current vehicle 100r, the preceding vehicle 100q, and the vehicle 100p run toward the post-step 60 at the running speed VC1 common between the vehicles while maintaining corresponding inter-vehicular distances at the target distance VD.

In the system 500 of the present embodiment, if the preceding vehicle 100q is ahead of the current vehicle 100r in running toward the post-step 60, the remote controller 312 adjusts an inter-vehicular distance between the preceding vehicle 100q and the current vehicle 100r at the target distance VD. In the case of running of a plurality of the vehicles 100 on the track RT, these vehicles are allowed to run on the track RT in an efficiently aligned manner, achieving an increase in the number of the vehicles 100 deliverable from the pre-step 50 to the track RT. This may reduce or eliminate a likelihood that even the pre-step 50 will become a subject of adjustment of a manufacturing time, making it possible to suppress or prevent reduction in productivity of the vehicle 100.

In the system 500 of the present embodiment, if a delay time in the post-step 60 is shorter than the predetermined threshold time, the remote controller 312 causes the vehicle 100 and the preceding vehicle to run in such a manner that an inter-vehicular distance therebetween becomes the first distance. If the delay time in the post-step 60 is equal to the threshold time or longer than the threshold time, the remote controller 312 causes the vehicle 100 and the preceding vehicle to run in such a manner that the inter-vehicular distance therebetween becomes the second distance shorter than the first distance. On the occurrence of delay in the processing in the post-step 60, by making the inter-vehicular distance shorter than a distance in a case without the delay, it becomes possible to increase the number of the vehicles 100 deliverable from the pre-step 50 to the track RT. Adjusting the inter-vehicular distance in response to the delay time in the post-step 60 achieves both the safety of the vehicle 100 during running and suppression or prevention of reduction in productivity of the vehicle 100.

C. Third Embodiment

Figure 8:
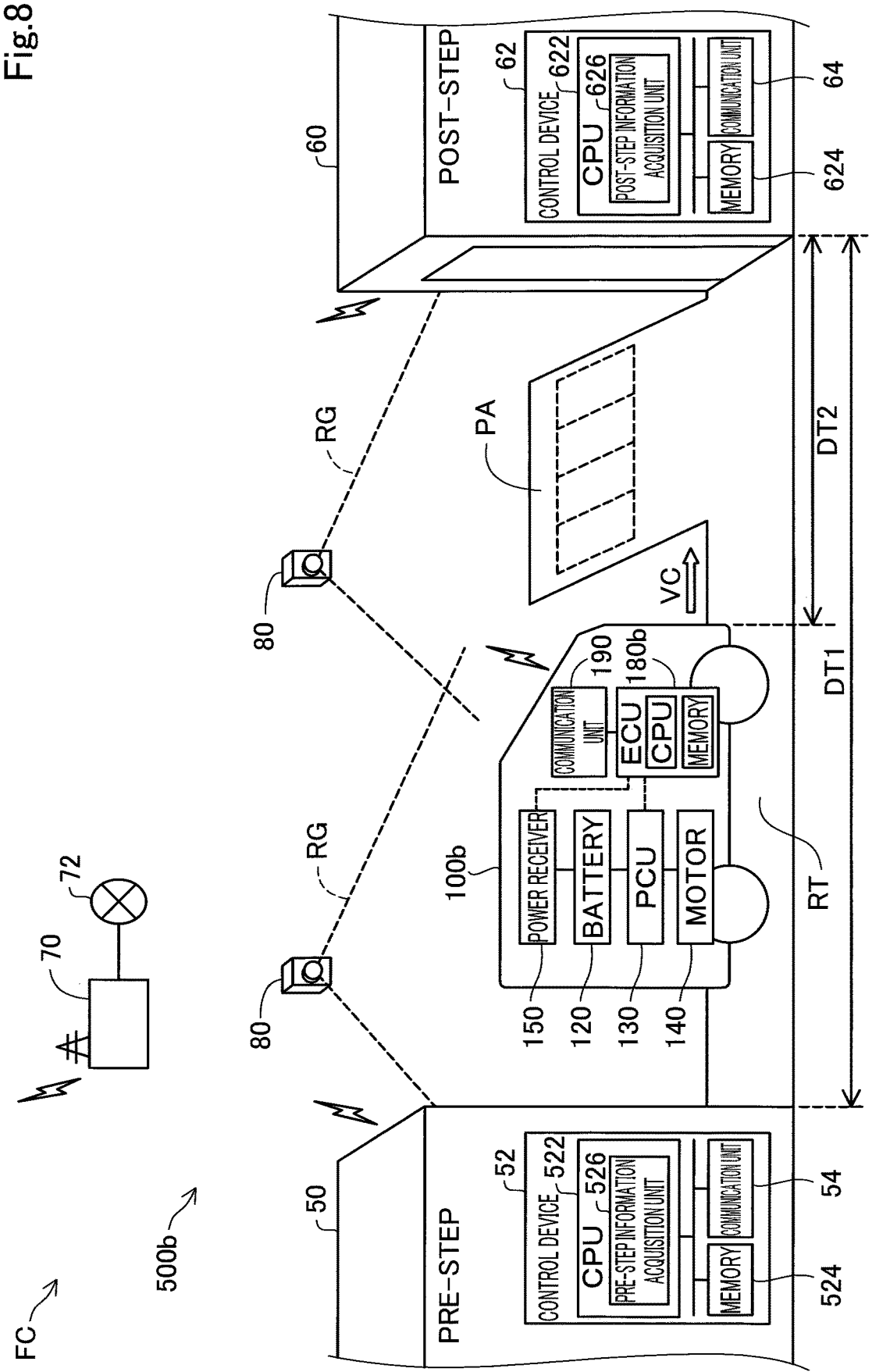
FIG. 8 is an explanatory view showing a schematic configuration of a system according to a third embodiment.

FIG. 8 is an explanatory view showing a schematic configuration of a system 500b according to a third embodiment. The present embodiment differs from the first embodiment in that the system 500b does not include the server 300. Unless specifically stated, the configuration of the system 500b is otherwise the same as that of the first embodiment.

Figure 9:
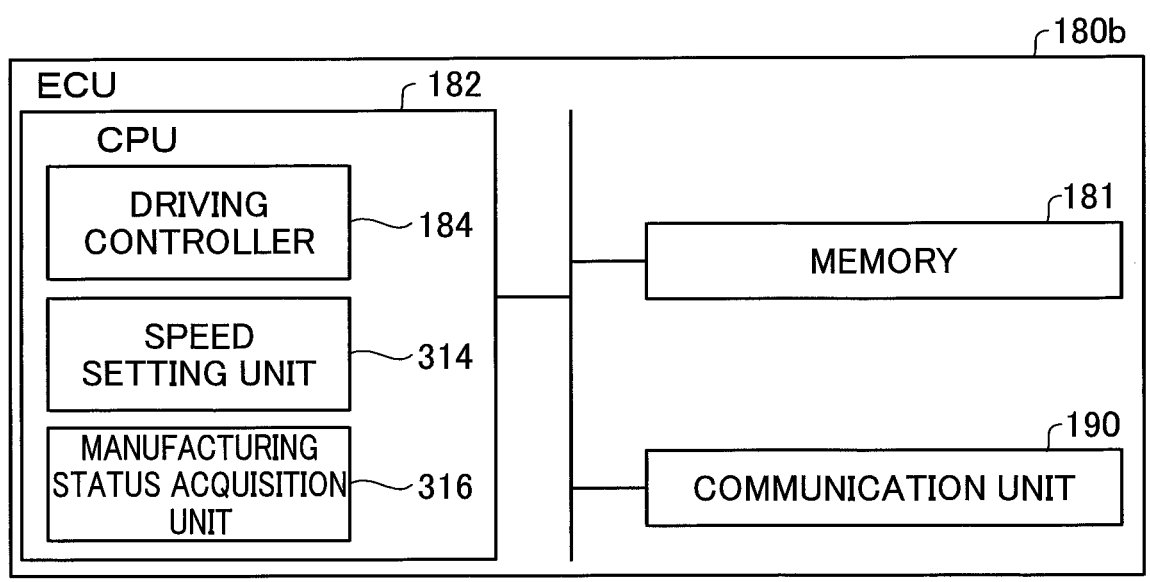
FIG. 9 is a block diagram showing a schematic configuration of an ECU of a vehicle according to the third embodiment.

FIG. 9 is a block diagram showing a schematic configuration of an ECU 180b of a vehicle 100b according to the third embodiment. As shown in FIG. 9, the ECU 180b includes a CPU 182 as a central processing unit, a memory 181 including a ROM or a RAM, for example, and a communication unit 190 connected to an interface circuit not shown in the drawings. These units are connected to each other via an internal bus in a manner allowing bidirectional communication therebetween. The CPU 182 executes various programs stored in the memory 181 to realize various functions including those as a driving controller 184, the speed setting unit 314, and the manufacturing status acquisition unit 316. As will be described later, the driving controller 184 of the present embodiment allows the vehicle 100b to run by autonomous control by the vehicle 100b.

Figure 10:
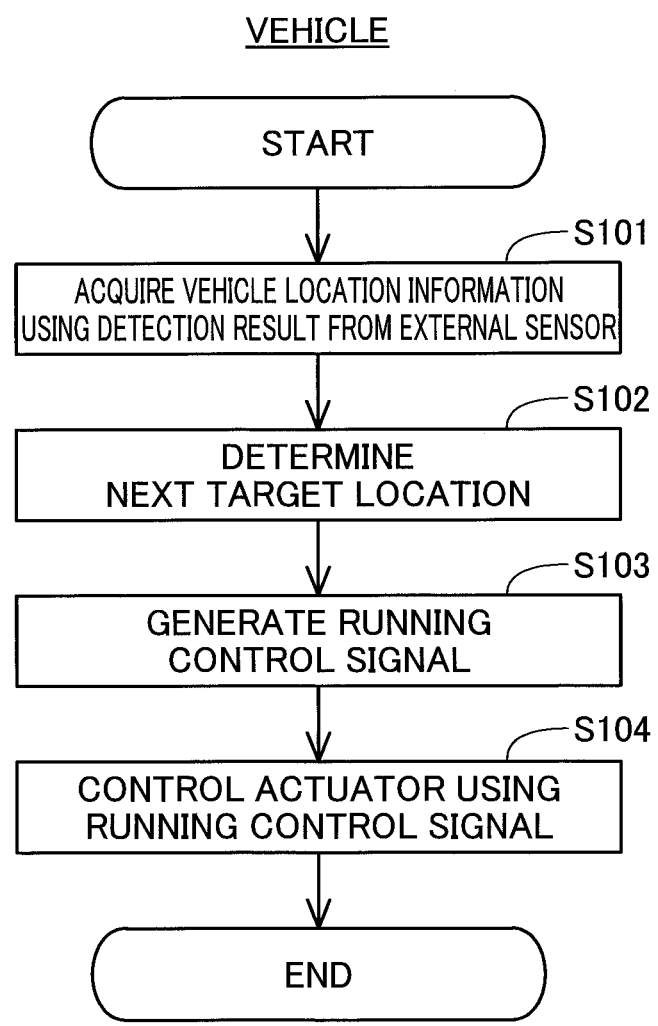
FIG. 10 is a flowchart showing a running method of causing the vehicle to run according to the third embodiment.

FIG. 10 is a flowchart showing a running method of causing the vehicle 100b to run according to the third embodiment. In step S101, the driving controller 184 acquires vehicle location information using detection result output from the camera 80 as an external sensor. In step S102, the driving controller 184 determines a target location to which the vehicle 100b is to move next. In the present embodiment, the memory 181 of the ECU 180b contains a reference route stored in advance. In step S103, the driving controller 184 generates a running control signal for causing the vehicle 100b to run to the determined target location. In step S104, the driving controller 184 controls an actuator using the generated running control signal, thereby causing the vehicle 100b to run at an acceleration and a steering angle indicated by the running control signal. The driving controller 184 repeats the acquisition of vehicle location information about the vehicle 100b, the determination of a target location, the generation of a running control signal, and the control over the actuator in a predetermined cycle. According to the vehicle 100b of the present embodiment, it is possible to cause the vehicle 100b to run by autonomous control without controlling the vehicle 100b remotely using the server 300.

In the present embodiment, each processing in the flowcharts in FIGS. 3 and 4 is performed by the ECU 180b of the vehicle 100b. More specifically, step S100 and step S400 in FIG. 3 are performed by the manufacturing status acquisition unit 316 of the vehicle 100b in the same way as that in the first embodiment. Step S200 is performed by the speed setting unit 314 of the vehicle 100b in the same way as that in the first embodiment. In step S600, the driving controller 184 causes the vehicle 100b to run by autonomous control to load the vehicle 100b into the post-step 60. Step S500 may be performed by the ECU 180b.

Steps S202, S210, S226, S240, S250, S260, and S270 are performed by the speed setting unit 314 of the vehicle 100b in the same way as that in the first embodiment. Steps S220, S222, S224, and S228 are performed by the driving controller 184 in the same way as that in the first embodiment. In step S290, the driving controller 184 causes the vehicle 100b to run by autonomous control toward the post-step 60 at the running speed VC set in each step described above.

As described above, the system 500b of the present embodiment also allows the running speed VC of the vehicle 100b to be changed to a running speed appropriate for a manufacturing status in the factory FC. Thus, it is possible to load the vehicle 100b into each step with timing appropriate for a manufacturing status in each step, allowing the vehicle 100b to be manufactured efficiently.

The configuration in the second embodiment is applicable to an embodiment such as the third embodiment where the vehicle 100b runs by autonomous control. Specifically, the manufacturing method shown in FIG. 5 may be implemented in the embodiment where the vehicle 100b runs by autonomous control, for example. The inter-vehicular distance adjustment processing shown in FIGS. 6 and 7 may be performed in this case.

D. Other Embodiments (D1) In each of the above-described embodiments, error from scheduled start time point is permitted in timing of arrival of the vehicle 100 at the post-step 60. By adjusting a manufacturing time in a step other than the post-step 60 that may be the pre-step 50, for example, in such a manner as to make the error cancellable, the timing may be determined to make a target manufacturing time per day attainable, for example. For example, arrival of the vehicle 100 may be earlier than the scheduled start time point by 100 seconds, 60 seconds, 10 seconds, 5 seconds, or 2 seconds, or arrival of the vehicle 100 may be later than the scheduled start time point by 2 seconds, 5 seconds, 10 seconds, 60 seconds, or 100 seconds.

(D2) In the example shown in the above-described first embodiment, if the manufacturing time in the post-step 60 is equal to the target manufacturing time, the speed setting unit 314 sets the running speed VC of the vehicle 100 to the reference speed Vtg. If the manufacturing time in the post-step 60 is longer than the target manufacturing time, the speed setting unit 314 sets the running speed VC to a speed lower than the reference speed Vtg. By contrast, the speed setting unit 314 may set the running speed VC independently of the manufacturing time in the post-step 60 using a manufacturing status in another step such as the pre-step 50, for example. Alternatively, the running speed may be changed steplessly in response to the length of delay in the manufacturing time from the target manufacturing time.

(D3) In the example shown in the above-described first embodiment, if the manufacturing time in the post-step 60 is longer than the threshold TH, the remote controller 312 stops the vehicle 100. By contrast, even if the manufacturing time in the post-step 60 is longer than the threshold TH, the remote controller 312 may still cause the vehicle 100 to run without stopping the vehicle 100. The speed of the vehicle 100 may be set to a minimum speed, or the vehicle 100 may be caused to run and stopped alternately repeatedly.

(D4) In the example shown in the above-described first embodiment, if the manufacturing time in the post-step 60 is longer than the threshold TH, the remote controller 312 causes the vehicle 100 to run to the parking area PA and stops the vehicle 100 in the parking area PA. By contrast, even if the manufacturing time in the post-step 60 is longer than the threshold TH, the vehicle 100 may not be caused to run to the parking area PA. In this case, the vehicle 100 may be parked on the track RT. In another case, independently of the manufacturing time in the post-step 60, the vehicle 100 may be caused to run to the parking area PA and placed on standby waiting to be loaded into the post-step 60.

(D5) In the example shown in the above-described first embodiment, the speed setting unit 314 sets the running speed VC of the vehicle 100 to run to the post-step 60 in such a manner that arrival timing of arrival of the vehicle 100 at the post-step 60 conforms to the acquired scheduled loading time point. By contrast, the speed setting unit 314 may set the running speed VC of the vehicle 100 using a parameter such as a target manufacturing time in the factory FC as a whole, a target manufacturing time in the pre-step 50, a time point of departure from the pre-step 50, or order of manufacturing the vehicle 100, other than the arrival timing of arrival at the post-step 60 or the scheduled loading time point.

(D6) In the example shown in the above-described second embodiment, the remote controller 312 sets an inter-vehicular distance between the preceding vehicle 100q and the current vehicle 100r to one of the first distance and the second distance. By contrast, the remote controller 312 may set the inter-vehicular distance not only to one of the first distance and the second distance but may set the inter-vehicular distance steplessly in response to the length of a delay time in the post-step 60. In another case, independently of the delay time in the post-step 60, the intervehicular distance may be adjusted at a uniform intervehicular distance on the occurrence of delay in the post-step 60.

(D7) In the example shown in the above-described first embodiment, if the manufacturing time in the post-step 60 is longer than the target manufacturing time, the speed setting unit 314 prolongs the manufacturing time in the pre-step 50. By contrast, even if the manufacturing time in the post-step 60 is longer than the target manufacturing time, it is still possible to avoid change in the manufacturing time in the pre-step 50. Furthermore, if the manufacturing time in the post-step 60 is shorter than the target manufacturing time, the manufacturing time in the pre-step 50 may be shortened.

(D8) In the example shown in each of the above-described embodiments, the speed setting unit 314 and the manufacturing status acquisition unit 316 are provided at the server 300. By contrast, functions including those of the speed setting unit 314 and the manufacturing status acquisition unit 316 may be provided at a device such as the vehicle 100 other than the server 300. In this case, as described in the third embodiment, both the functions as the speed setting unit 314 and the manufacturing status acquisition unit 316 may be provided at the vehicle 100, or only one of these functions may be provided at the vehicle 100.

(D9) In each of the above-described embodiments, the vehicle 100 is simply required to have a configuration to become movable by unmanned driving, and may be embodied as a platform having the following configuration, for example. More specifically, in order to fulfill three functions including "run," "turn," and "stop" by unmanned driving, the vehicle 100 is simply required to include at least the ECU 180 that controls running of the vehicle 100, and various types of actuators such as a driving device, a steering device, and a braking device. The actuators are controlled by the controller that controls running of the vehicle 100. In order for the vehicle 100 to acquire information from outside for unmanned driving, the vehicle 100 is simply required to include the communication unit 190 further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from a factory, or a remaining component such as a bodyshell may be mounted on the vehicle 100 after the vehicle 100 is shipped from a factory while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(D10) In each of the above-described embodiments, the vehicle 100 may be manufactured by any manufacturing method. For example, the vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(D11) In the above-described first and second embodiments, the server 300 performs the processing from acquisition of vehicle location information to generation of a running control signal. By contrast, the vehicle 100 may perform at least part of the processing from acquisition of vehicle location information to generation of a running control signal. For example, embodiments (1) to (3) described below are applicable, for example.

(1) The server 300 may acquire vehicle location information, determine a target location to which the vehicle 100 is to move next, and generate a route from a current location of the vehicle 100 indicated by the acquired vehicle location information to the target location. The server 300 may generate a route to the target location between the current location and a destination or generate a route to the destination. The server 300 may transmit the generated route to the vehicle 100. The vehicle 100 may generate a running control signal in such a manner as to cause the vehicle 100 to run along the route received from the server 300 and control an actuator using the generated running control signal.

(2) The server 300 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control an actuator using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the server 300 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(D12) In the above-described third embodiment, the vehicle 100*b* may be equipped with an internal sensor, and detection result output from the internal sensor may be used in at least one of generation of a route and generation of a running control signal. For example, the vehicle 100*b* may acquire detection result from the internal sensor, and in generating the route, may reflect the detection result from the internal sensor in the route. The vehicle 100*b* may acquire detection result from the internal sensor, and in generating the running control signal, may reflect the detection result from the internal sensor in the running control signal.

(D13) In the above-described third embodiment, the vehicle 100*b* acquires vehicle location information using detection result from the camera 80 that is the external sensor. By contrast, the vehicle 100*b* may be equipped with an internal sensor, the vehicle 100*b* may acquire vehicle location information using detection result from the internal sensor, determine a target location to which the vehicle 100*b* is to move next, generate a route from a current location of the vehicle 100*b* indicated by the acquired vehicle location information to the target location, generate a running control signal for running along the generated route, and control an actuator of the vehicle 100 using the generated running control signal. In this case, the vehicle 100*b* is capable of running without using any detection result from an external sensor. The vehicle 100*b* may acquire target arrival time or traffic congestion information from outside the vehicle 100 and reflect the target arrival time or traffic congestion information in at least one of the route and the running control signal. The functional configuration of the system 500 may be entirely provided at the vehicle 100. Specifically, the processes realized by the system 500 or server 300 in the present disclosure may be realized by the vehicle 100 alone.

(D14) In the above-described first and second embodiments, the server 300 automatically generates a running control signal to be transmitted to the vehicle 100. By contrast, the server 300 may generate a running control signal to be transmitted to the vehicle 100 in response to operation by an external operator existing outside the vehicle 100. For example, the external operator may operate an operating device including a display on which a captured image output from the camera 80 as an external sensor is displayed, steering, an accelerator pedal, and a brake pedal for operating the vehicle 100 remotely, and a communication device for making communication with the server 300 through wire communication or wireless communication, for example, and the remote controller 312 of the server 300 may generate a running control signal responsive to the operation on the operating device. The configuration of the operating device is not limited to that described above but the operating device may include an operation button or an operation lever for operating the vehicle 100 remotely, for example.

In the foregoing embodiment where the running control signal is generated in response to the operation by the external operator, when the speed setting unit 314 sets the running speed VC of the vehicle 100 using a manufacturing status, the remote controller 312 may correct a primary parameter in response to the running speed VC that is an acceleration or a speed determined by the operation by the external operator to generate a secondary parameter, generate a running control signal including the secondary parameter, and transmit the generated running control signal to the vehicle 100. In this case, in response to the set running speed VC, the remote controller 312 may correct the primary parameter that is an acceleration or a speed determined by the amount of depression of the accelerator pedal or the brake pedal provided at the operating device, for example. More specifically, if the primary parameter is insufficient for causing the vehicle 100 to run at the running speed VC, the remote controller 312 may increase the primary parameter. If the primary parameter is excessive for causing the vehicle 100 to run at the running speed VC, the remote controller 312 may reduce the primary parameter. If the primary parameter is neither insufficient nor excessive for causing the vehicle 100 to run at the running speed VC, the remote controller 312 may generate the secondary parameter without changing the primary parameter. By doing so, like in the cases described in the first to third embodiments, the vehicle 100 becomes capable of running at a running speed appropriate for a manufacturing status in the factory FC. This makes it possible to load the vehicle 100 into each step with timing appropriate for a manufacturing status in each step, allowing the vehicle 100 to be manufactured efficiently.

(D15) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

The control and the method described in the present disclosure may be realized by a dedicated computer provided by configuring a processor and a memory programmed in such a manner as to implement one or a plurality of functions embodied by a computer program. Alternatively, the controller and the method described in the present disclosure may be realized by a dedicated computer provided by configuring a processor using one or more dedicated hardware logic circuits. Still alternatively, the controller and the method described in the present disclosure may be realized by one or more dedicated computers configured using a combination of a processor and a memory programmed in such a manner as to implement one or a plurality of functions, and a processor configured using one or more hardware logic circuits. The computer program may be stored as an instruction to be executed by a computer into a computer-readable tangible non-transitory recording medium.

The present disclosure is not limited to the embodiments described above and is able to be realized with various configurations without departing from the spirit thereof. For example, technical features in the embodiments may be replaced with each other or combined together as necessary in order to solve part or the whole of the problems described previously or to achieve part or the whole of the effects described previously. When the technical features are not described as essential features in the present specification, they are able to be deleted as necessary. For example, the present disclosure may be realized with embodiments which will be described below.

(1) According to a first aspect of the present disclosure, a system that is used in a factory for manufacture of a moving object is provided. The system comprises: a remote controller that moves the moving object by remote control, the moving object being movable in the factory during a course of manufacture in the factory, the moving object including a communication device having a communication function for the remote control and a driving controller that implements driving control over the moving object; a manufacturing status acquisition unit that acquires information about a manufacturing status in the factory, the manufacturing status including delay in a step; and a speed setting unit that sets a moving speed of the moving object using the acquired manufacturing status. The remote controller moves the moving object in a transport zone between steps at the set moving speed of the moving object by the remote control.

According to the system of this aspect, it is possible to change the moving speed of the moving object to a moving speed appropriate for the manufacturing status in the factory. Thus, it is possible to load the moving object with timing appropriate for each step, allowing the moving object to be manufactured efficiently.

(2) In the system of the above-described aspect, the manufacturing status acquisition unit may acquire information about a manufacturing time as the manufacturing status, the manufacturing time being required for a processing in a post-step as a destination of moving of the moving object. The speed setting unit may set the moving speed of the moving object to move to the post-step using the acquired information about the manufacturing time in the post-step.

According to the system of this aspect, it is possible to manufacture the moving object by loading the moving object into the post-step with timing appropriate for the manufacturing status in the post-step, allowing the moving object to be manufactured efficiently.

(3) In the system of the above-described aspect, when the manufacturing time in the post-step is equal to a target manufacturing time, the speed setting unit may set the moving speed of the moving object to move to the post-step to a predetermined reference speed. If the manufacturing time in the post-step is longer than the target manufacturing time, the speed setting unit may set the moving speed of the moving object to move to the post-step to a speed lower than the predetermined reference speed.

According to the system of this aspect, it is possible to load the moving object into the post-step in conformity with the target manufacturing time in the post-step, allowing the moving object to be manufactured more efficiently.

(4) In the system of the above-described aspect, when the manufacturing time in the post-step is longer than a predetermined stop judgment time to be longer than the target manufacturing time, the remote controller may stop the moving object.

According to the system of this aspect, when the manufacturing time in the post-step is longer than the stop judgment time, stopping flow of a product makes it possible to suppress or prevent excessive retention of moving objects on standby waiting to be loaded into the post-step. This reduces excess in items to be processed in the post-step, making it possible to suppress reduction in production efficiency of the moving object.

(5) In the system of the above-described aspect, if the manufacturing time in the post-step is longer than the stop judgment time, the remote controller may also move the moving object to a predetermined standby location and stop the moving object at the predetermined standby location.

According to the system of this aspect, it is possible to reduce or eliminate a likelihood that the moving object on standby waiting to be loaded into the post-step will retain on a track between steps, for example, to become a hindrance to moving of another moving object.

(6) In the system of the above-described aspect, when the predetermined standby location is unavailable, the remote controller may stop the moving object without moving the moving object to the predetermined standby location.

According to the system of this aspect, it is possible to prevent the moving object from moving unnecessarily to the standby location.

(7) In the system of the above-described aspect, the manufacturing status acquisition unit may acquire a scheduled loading time point when the moving object becomes loadable into the post-step as the information about the manufacturing time in the post-step. The speed setting unit may set the moving speed of the moving object to move to the post-step in such a manner that arrival timing of arrival of the moving object at the post-step conforms to the acquired scheduled loading time point.

According to the system of this aspect, it is possible to load the moving object into the post-step on the scheduled loading time point of loading into the post-step, allowing the moving object to be manufactured more efficiently.

(8) In the system of the above-described aspect, when a preceding moving object, the remote controller may adjust a distance between moving objects between the preceding moving object and the moving object, the preceding moving object being different from the moving object and being ahead of the moving object, the distance between moving objects being between the preceding moving object and the moving object.

According to the system of this aspect, in the case of moving of a plurality of moving objects to the post-step, these moving objects are allowed to be aligned efficiently, achieving an increase in the number of moving objects deliverable from a pre-step to a zone of transport to the post-step. This may reduce or eliminate a likelihood that even the pre-step will become a subject of adjustment of a manufacturing time, making it possible to suppress or prevent reduction in productivity of the moving object.

(9) In the system of the above-described aspect, the manufacturing status acquisition unit may acquire information about a manufacturing time in the post-step as the manufacturing status. When the acquired manufacturing time in the post-step is longer than a target manufacturing time in the post-step and when a delay time from the target manufacturing time is shorter than a predetermined threshold time, the remote controller may move the moving object and the preceding moving object in such a manner that the distance between moving objects becomes a first distance. When the acquired manufacturing time in the post-step is longer than the target manufacturing time and when the delay time is equal to the predetermined threshold time or longer than the predetermined threshold time, the remote controller may move the moving object and the preceding moving object in such a manner that the distance between moving objects becomes a second distance shorter than the first distance.

According to the system of this aspect, adjusting the distance between moving objects in response to the delay time from the target manufacturing time in the post-step achieves both the safety of the moving object during moving and suppression or prevention of reduction in productivity of the moving object.

(10) In the system of the above-described aspect, the manufacturing status acquisition unit may acquire information as the manufacturing status that is about a manufacturing time required for processing in a post-step as a destination of moving of the moving object. When the manufacturing time in the post-step is longer than a target manufacturing time, the speed setting unit may prolong a target manufacturing time in a pre-step performed before the post-step.

According to the system of this aspect, on the occurrence of delay in the processing in the post-step, it is possible to delay delivery of the moving object to the transport zone by prolonging the target manufacturing time in the pre-step. This suppresses increase in items being processed in the post-step, making it possible to suppress or prevent retention of the moving object between the steps having been delivered from the pre-step.

(11) According to a second aspect of the present disclosure, a moving object is provided. The moving object comprises: a driving controller that implements driving control over the moving object, the moving object being movable in a factory for manufacture of the moving object during a course of manufacture in the factory; a manufacturing status acquisition unit that acquires information about a manufacturing status in the factory, the manufacturing status including delay in a step; and a speed setting unit that sets a moving speed of the moving object using the acquired manufacturing status. The driving controller moves the moving object in a transport zone between steps at the set moving speed of the moving object.

(12) According to a third aspect of the present disclosure, a method of manufacturing a moving object is provided. The method of manufacturing the moving object comprises the steps of: moving the moving object by unmanned driving in a factory for manufacture of the moving object during a course of manufacture in the factory; acquiring information about a manufacturing status in the factory, the manufacturing status including delay in a step; and setting a moving speed of the moving object using the acquired manufacturing status. The moving object moves by the unmanned driving in a transport zone between steps at the set moving speed of the moving object.

(13) According to a fourth aspect of the present disclosure, a server is provided. The server comprises: a remote controller that moves a moving object by remote control, the moving object being movable in a factory for manufacture of the moving object during a course of manufacture in the factory, the moving object including a communication device having a communication function for the remote control and a driving controller that implements driving control over the moving object; a manufacturing status acquisition unit that acquires information about a manufacturing status in the factory, the manufacturing status including delay in a step; and a speed setting unit that sets a moving speed of the moving object using the acquired manufacturing status. The remote controller moves the moving object in a transport zone between steps at the set moving speed by the remote control.

The present disclosure is feasible in various aspects other than the system. For example, the present disclosure may be realized in aspects including a method of controlling a moving object, a computer program realizing such a control method, and a non-transitory recording medium storing such a computer program.

What is claimed is:

1. A system used in a factory for manufacture of a moving object, comprising:
    a remote controller that moves the moving object by remote control, the moving object being movable in the factory during a course of manufacture in the factory, the moving object including a communication device having a communication function for the remote control and a driving controller that implements driving control over the moving object;
    a manufacturing status acquisition unit that acquires information about a manufacturing status in the factory, the manufacturing status including delay in a step; and
    a speed setting unit that sets a moving speed of the moving object using the manufacturing status, wherein
    the remote controller moves the moving object in a transport zone between steps at the set moving speed by the remote control,
    the manufacturing status acquisition unit acquires information about a manufacturing time as the manufacturing status, the manufacturing time being required for a processing in a post-step as a destination of moving of the moving object,
    the speed setting unit sets the moving speed of the moving object to move to the post-step using the acquired information about the manufacturing time in the post-step,
    when the manufacturing time in the post-step is equal to a target manufacturing time, the speed setting unit sets the moving speed of the moving object to move to the post-step to a predetermined reference speed,
    when the manufacturing time in the post-step is longer than the target manufacturing time, the speed setting unit sets the moving speed of the moving object to move to the post-step to a speed lower than the predetermined reference speed,
    when the manufacturing time in the post-step is longer than a predetermined stop judgment time to be longer than the target manufacturing time, the remote controller stops the moving object,
    when the manufacturing time in the post-step is longer than the predetermined stop judgment time, the remote controller moves the moving object to a predetermined standby location and stops the moving object at the predetermined standby location, and
    when the predetermined standby location is unavailable, the remote controller stops the moving object without moving the moving object to the predetermined standby location.

2. The system according to claim 1, wherein
    the manufacturing status acquisition unit acquires a scheduled loading time point at which the moving object becomes loadable into the post-step as the information about the manufacturing time in the post-step, and
    the speed setting unit sets the moving speed of the moving object to move to the post-step in such a manner that arrival timing of arrival of the moving object at the post-step conforms to the acquired scheduled loading time point.

3. The system according to claim 1, wherein
    when a preceding moving object moves to a post-step as a destination of the moving object, the remote controller adjusts a distance between moving objects, the preceding moving object being different from the moving object and being ahead of the moving object, the distance between moving objects being between the preceding moving object and the moving object.

4. The system according to claim 3, wherein
the manufacturing status acquisition unit acquires information about a manufacturing time in the post-step as the manufacturing status,
when the manufacturing time in the post-step is longer than a target manufacturing time in the post-step and when a delay time from the target manufacturing time is shorter than a predetermined threshold time, the remote controller moves the moving object and the preceding moving object in such a manner that the distance between moving objects becomes a first distance, and
when the manufacturing time in the post-step is longer than the target manufacturing time and when the delay time is equal to the predetermined threshold time or longer than the predetermined threshold time, the remote controller moves the moving object and the preceding moving object in such a manner that the distance between moving objects becomes a second distance shorter than the first distance.

5. The system according to claim 1, wherein
the manufacturing status acquisition unit acquires information as the manufacturing status that is about a manufacturing time required for a processing in a post-step as a destination of moving of the moving object, and
when the manufacturing time in the post-step is longer than a target manufacturing time, the speed setting unit prolongs a target manufacturing time in a pre-step performed before the post-step.

6. A moving object, comprising:
a driving controller that implements driving control over the moving object, the moving object is movable in a factory for manufacture of the moving object during a course of manufacture in the factory;
a manufacturing status acquisition unit that acquires information about a manufacturing status in the factory, the manufacturing status including delay in a step; and
a speed setting unit that sets a moving speed of the moving object using the manufacturing status, wherein
the driving controller moves the moving object in a transport zone between steps at the set moving speed of the moving object,
the manufacturing status acquisition unit acquires information about a manufacturing time as the manufacturing status, the manufacturing time being required for a processing in a post-step as a destination of moving of the moving object,
the speed setting unit sets the moving speed of the moving object to move to the post-step using the acquired information about the manufacturing time in the post-step,
when the manufacturing time in the post-step is equal to a target manufacturing time, the speed setting unit sets the moving speed of the moving object to move to the post-step to a predetermined reference speed,
when the manufacturing time in the post-step is longer than the target manufacturing time, the speed setting unit sets the moving speed of the moving object to move to the post-step to a speed lower than the predetermined reference speed,
when the manufacturing time in the post-step is longer than a predetermined stop judgment time to be longer than the target manufacturing time, the driving controller stops the moving object,
when the manufacturing time in the post-step is longer than the predetermined stop judgment time, the driving controller moves the moving object to a predetermined standby location and stops the moving object at the predetermined standby location, and
when the predetermined standby location is unavailable, the driving controller stops the moving object without moving the moving object to the predetermined standby location.

7. A method of manufacturing a moving object, comprising the steps of:
moving the moving object by unmanned driving in a factory for manufacture of the moving object during a course of manufacture in the factory;
acquiring information about a manufacturing status in the factory, the manufacturing status including delay in a step;
setting a moving speed of the moving object using the manufacturing status;
moving by the unmanned driving in a transport zone between steps at the set moving speed of the moving object;
acquiring information about a manufacturing time as the manufacturing status, the manufacturing time being required for a processing in a post-step as a destination of moving of the moving object;
setting the moving speed of the moving object to move to the post-step using the acquired information about the manufacturing time in the post-step;
when the manufacturing time in the post-step is equal to a target manufacturing time, setting the moving speed of the moving object to move to the post-step to a predetermined reference speed;
when the manufacturing time in the post-step is longer than the target manufacturing time, setting the moving speed of the moving object to move to the post-step to a speed lower than the predetermined reference speed;
when the manufacturing time in the post-step is longer than a predetermined stop judgment time to be longer than the target manufacturing time, stopping the moving object;
when the manufacturing time in the post-step is longer than the predetermined stop judgment time, moving the moving object to a predetermined standby location and stopping the moving object at the predetermined standby location; and
when the predetermined standby location is unavailable, stopping the moving object without moving the moving object to the predetermined standby location.

8. A server comprising:
a remote controller that moves a moving object by remote control, the moving object being movable in a factory for manufacture of the moving object during a course of manufacture in the factory, the moving object including a communication device having a communication function for the remote control and a driving controller that implements driving control over the moving object;
a manufacturing status acquisition unit that acquires information about a manufacturing status in the factory, the manufacturing status including delay in a step; and
a speed setting unit that sets a moving speed of the moving object using the manufacturing status, wherein
the remote controller moves the moving object in a transport zone between steps at the set moving speed by the remote control, the manufacturing status acquisition unit acquires information about a manufacturing time as the manufacturing status, the manufacturing time being required for a processing in a post-step as a destination of moving of the moving object, the speed setting unit sets the moving speed of the moving object to move to the post-step using the acquired information about the manufacturing time in the post-step, when the manufacturing time in the post-step is equal to a target manufacturing time, the speed setting unit sets the moving speed of the moving object to move to the post-step to a predetermined reference speed, when the manufacturing time in the post-step is longer than the target manufacturing time, the speed setting unit sets the moving speed of the moving object to move to the post-step to a speed lower than the predetermined reference speed, when the manufacturing time in the post-step is longer than a predetermined stop judgment time to be longer than the target manufacturing time, the remote controller stops the moving object, when the manufacturing time in the post-step is longer than the predetermined stop judgment time, the remote controller moves the moving object to a predetermined standby location and stops the moving object at the predetermined standby location, and when the predetermined standby location is unavailable, the remote controller stops the moving object without moving the moving object to the predetermined standby location.

\* \* \* \* \*